(12) United States Patent
Guo et al.

(10) Patent No.: US 7,426,178 B2
(45) Date of Patent: *Sep. 16, 2008

(54) VERTICAL ROAMING IN WIRELESS NETWORKS THROUGH IMPROVED WIRELESS NETWORK CELL BOUNDARY DETECTION

(75) Inventors: Zihua Guo, Beijing (CN); Qian Zhang, Beijing (CN); Richard Yao, Morris Plains, NJ (US); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 469 days.

This patent is subject to a terminal disclaimer.

(21) Appl. No.: 11/146,965

(22) Filed: Jun. 7, 2005

(65) Prior Publication Data

US 2005/0213542 A1   Sep. 29, 2005

Related U.S. Application Data

(63) Continuation of application No. 10/376,881, filed on Feb. 28, 2003, now Pat. No. 6,982,949.

(51) Int. Cl.
*H04J 11/00* (2006.01)
(52) U.S. Cl. .................................. 370/210; 370/331
(58) Field of Classification Search ................. None
See application file for complete search history.

(56) References Cited

U.S. PATENT DOCUMENTS

| | | | |
|---|---|---|---|
| 5,383,225 A | 1/1995 | Aguirre et al. | |
| 5,497,504 A | 3/1996 | Acampora et al. | |
| 6,243,581 B1 | 6/2001 | Jawanda | |
| 6,434,134 B1 | 8/2002 | La Porta et al. | |
| 6,473,602 B1 * | 10/2002 | Bottomley | 455/226.1 |
| 6,944,144 B2 | 9/2005 | Guo et al. | |
| 6,959,406 B2 | 10/2005 | Goldsack et al. | |
| 6,993,593 B2 | 1/2006 | Iwata | |
| 2003/0054843 A1 | 3/2003 | Notani et al. | |
| 2003/0142643 A1 | 7/2003 | Yang et al. | |
| 2003/0193910 A1 | 10/2003 | Shoaib et al. | |
| 2004/0174815 A1 | 9/2004 | Khisti et al. | |
| 2004/0252701 A1 | 12/2004 | Anadakumar et al. | |

OTHER PUBLICATIONS

Beach et al, Parameter Optimization for Soft Handover in the Third Generation Cellular Environment, IEEE, pp. 144-148, 1995.*

(Continued)

*Primary Examiner*—Frank Duong
(74) *Attorney, Agent, or Firm*—Lee & Hayes, PLLC

(57) ABSTRACT

A system and method for improved vertical handoff between different types of wireless network. Network allocation vector occupation and packet collision probability are used as quality of service measures, enabling vertical handoffs to be delayed until actually beneficial to quality of service. Improved wireless network cell boundary detection in vertical handoff scenarios is achieved with a Fourier-based technique in conjunction with an adaptively determined minimum operating signal strength threshold. Improved wireless network cell boundary detection enables vertical handoffs from high quality of service networks to be delayed as long as possible. Together, practical wireless network quality of service measures and improved detection of wireless network cell boundaries in vertical handoff scenarios reduce the rate of unnecessary vertical handoff resulting in higher overall quality of service experienced by a mobile computing device roaming between wireless network types.

20 Claims, 17 Drawing Sheets

OTHER PUBLICATIONS

Salkintzis, WLAN-GPRS Integration for Next-Generation Mobile Data Networks, IEEE, pp. 112-124, 2002.*

Zhang et al, Efficient Mobility Management for Vertical Handoff between WWAN and WLAN, IEEE, pp. 102-108, 2003.*

Corazza, G. E. et al., "Characterization of Handover Initialization in Cellular Mobile Radio Networks," Proceedings *of 44th IEEE Vehicular Technology Conference (VTC)*, Stockholm, pp. 1869-1872 (Jun. 1994).

Gudmundson, Mikael, "Analysis of Handover Algorithms," *IEEE Vehicular Technology Conference,* pp. 537-542 (Jul. 1991).

IEEE Std. 100-1006, "The IEEE Standard Dictionary of Electrical and Electronics Terms," 6th Edition; p. 369 (1996).

McNair, Janise et al., "An Inter-System Handoff Technique for the IMT-2000 System," *INFOCOM 2000,* pp. 208-216 (Mar. 2000).

Pahiavan, Kaveh et al., "Handoff in Hybrid Mobile Data Networks," *IEEE Personal Communications,* pp. 34-47 (Apr. 2000).

Sanmateu, A. et al., "Using mobile IP for provision of seamless handoff between heterogeneous access networks, or how a network can support the Always-On concept," *EURESCOM Summit 2001,* 11 pgs. (2001).

Vijayan, Rajiv and Jack M. Holtzman, "The Dynamic Behavior of Handoff Algorithms," *Proceedings of the 1st International Conference on Universal Personal Communications,* Dallas, TX, pp. 39-43 (Sep. 1992).

Ylianttila, M. et al., "Optimization Schema for Mobile Users Performing Vertical Handoffs between IEEE 802.11 and GPRS/EDGE Networks," *Proceedings of IEEE/GLOBECOM,* vol. 6, pp. 3439-3443 (2001).

Gwon et al., "Adaptive Approach for Locally Optimized IP Handoffs Across Heterogeneous Wireless Networks," IEEE, pp. 475-479 (2002).

IEEE, "MAC Sublayer Functional Description," ANSI/IEEE Std. 802.11, Chapter 9, pp. 70-96 (1999).

Katz et al. "Vertical Handoffs in wireless overlay networks", Baltzer Science Publishers BV, pp. 335-350, 1998.

Laurenson et al., "The Application of a Generalized Sliding FFT Algorithm to Prediction for a RAKE Receiver System Operating Over Mobile Channels," IEEE, pp. 1823-1827.

* cited by examiner

US 7,426,178 B2

VERTICAL ROAMING IN WIRELESS NETWORKS THROUGH IMPROVED WIRELESS NETWORK CELL BOUNDARY DETECTION

CROSS-REFERENCE TO RELATED PATENT APPLICATIONS

This patent application is a continuation of a U.S. patent application Ser. No. 10/376,881, filed Feb. 28, 2003, now U.S. Pat. No. 6,982,949 entitled "IMPROVED VERTICAL ROAMING IN WIRELESS NETWORKS THROUGH IMPROVED WIRELESS NETWORK CELL BOUNDARY DETECTION."

FIELD OF THE INVENTION

This invention pertains generally to wireless networks, and more particularly, to a wireless networking environment that includes more than one type of wireless network.

BACKGROUND OF THE INVENTION

Today, people use digital networks to communicate in many different ways. Speech, text, World Wide Web pages and streaming live video are just a few examples. The ability to connect to a digital network at a particular physical location is one thing. The ability to connect to a digital network while remaining mobile is quite another. Wireless digital networks are popular and becoming more so. People value the convenience and freedom offered by a wireless network.

Radio is the base technology underlying most wireless digital networks. Each wireless network base station or access point, and each mobile device capable of communicating with the access point, is able to both transmit and receive radio signals. The radio signals are encoded with wireless network data.

It is in the nature of radio signals that signal strength fades with increasing distance from a transmitter. Each wireless network is designed to operate in a certain range of signal strengths, so that when the signal strength drops below a certain point, the quality of service provided by the wireless network drops dramatically. The geographical area served by a single wireless network access point is a wireless network cell. A wireless network provides service to larger geographical areas by dividing the larger area into cells, each with an access point. As a mobile communications device moves through the cells, it communicates with each cell's access point in turn.

One of the traditional problems for wireless network designers is deciding when a mobile device should handoff communications from one wireless network access point to another. The decrease in the quality of service provided to a mobile device by a wireless network access point is nonlinear, particularly near cell boundaries, and the radio environment is dynamic, so that analysis of the problem is not trivial. In practice, most horizontal handoff algorithms rely on a comparison of the relative signal strengths from candidate access points. A horizontal handoff is a communications handoff that occurs between wireless network access points of the same type within a single type of wireless network.

There are many different types of wireless network, each designed to meet different goals. For example, wireless networks complying with standards such as the General Packet Radio Service (GPRS) and Code Division Multiple Access (CDMA) are designed to provide a relatively low level of digital communications bandwidth (e.g., 64 kbps) over a wide geographical area (e.g., a metropolitan area), whereas wireless networks complying with other standards, such as the Institute of Electrical and Electronics Engineers' (IEEE) 802.11 series of standards and the European Telecom Standards Institute's (ETSI) High Performance Radio Local Area Network (HIPERLAN) series of standards, are designed to provide a relatively high level of digital communications bandwidth (e.g., 10 Mbps) but over a much smaller geographical area (e.g., a building or campus). These examples illustrate one set of wireless network design tradeoffs, i.e., bandwidth versus cell size. Other design considerations include how the radio spectrum allocated to each network will be shared among its users as well as user authentication and privacy measures.

Many geographical locations are served by multiple wireless network types, for example, CDMA and IEEE 802.11b. It is desirable for a wireless network user to be able to take advantage of the best features of each network type, for example, to be able to take advantage of a CDMA wireless network's wide service area and also to be able to take advantage of an IEEE 802.11b wireless network's high bandwidth where service is available. It is possible for a wireless network user to manually switch between wireless network types but it is further desirable that vertical handoff, i.e., handoff between different types of wireless network, become as transparent to a wireless network user as horizontal handoff within a wireless network is today. A future is envisioned in which a wireless network user is able to roam seamlessly between network types according to the wireless network user's needs, but there are several problems that need to be solved in order for that future to be realized.

Wireless network standards such as CDMA and IEEE 802.11b, are generally incompatible and are not focused on supporting vertical handoffs. Signal strengths in different wireless networks are not directly comparable. A level of signal strength that provides a good quality of service in one wireless network may result in a poor quality of service in another. New handoff decision criteria are required. Some prior art (e.g., *Optimization Scheme for Mobile Users Performing Vertical Handoffs between IEEE 802.11 and GPRS/EDGE networks*, Ylianttila et al.) discusses the use of quality of service criteria, such as bandwidth, for making vertical handoff decisions but it is generally silent on how to obtain quality of service measures in practice. There is a need in the art for a practical system and method to implement seamless vertical handoffs between wireless network types.

The invention provides such a system and method. These and other advantages of the invention, as well as additional inventive features, will be apparent from the description of the invention provided herein.

BRIEF SUMMARY OF THE INVENTION

The invention provides a system and method for improved vertical handoff between different types of wireless network. More particularly, the invention is directed to enabling the reliable detection of wireless network cell boundaries in vertical handoff scenarios. Reliable detection of wireless network cell boundaries in vertical handoff scenarios is an important part of reducing the rate of unnecessary vertical handoff. Reducing the rate of unnecessary vertical handoff results in a higher overall quality of service for a mobile computing device roaming between wireless network types.

Conventional horizontal handoffs rely on a comparison of received signal strengths at a mobile computing device from candidate wireless network cells to detect wireless network cell boundaries. In a vertical handoff scenario, the received signal strengths at a mobile computing device from candidate wireless network cells are not directly comparable because the candidate wireless network cells are not of the same type. A mobile computing device detects a wireless network cell boundary without reference to another wireless network cell of the same type by reliably detecting that received signal strength is decreasing and is close to a minimum operating signal strength threshold.

A mobile computing device reliably detects that signal strength received at the mobile computing device is decreasing utilizing a Fourier analysis of the recent received signal strength history. In particular, if the imaginary part of the fundamental term of a Discrete Fourier Transform of the recent received signal strength history is negative and less than a Fourier domain threshold, then the received signal strength is determined by the mobile computing device to be decreasing.

The nominal minimum operating signal strength threshold specified by a wireless network standard is typically higher than the actual minimum operating signal strength thresholds achievable by modern wireless network interface hardware. High minimum operating signal strength thresholds raise the rate of unnecessary vertical handoff. A mobile computing device is able to take advantage of the lower minimum operating signal strength thresholds of modern wireless network interface hardware by adaptively determining the value of that lower threshold for each wireless network interface.

The ability to detect wireless network cell boundaries is particularly useful when deciding to handoff from a wireless network with a smaller geographical coverage area to a wireless network with a larger geographical coverage area. When deciding to handoff from a wireless network with a larger geographical coverage area to a wireless network with a smaller geographical coverage area, the ability to measure wireless network quality of service also becomes significant. A software architecture that incorporates both vertical handoff decision facilities implements a seamless vertical roaming that optimizes overall wireless network quality of service experienced by a mobile computing device incorporating the architecture.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a mobile computing device and wireless networking environment in which the various embodiments of the invention may be practiced is first provided. Although not required, the invention will be described in the general context of computer-executable instructions, such as program modules, being executed by a computing device. Generally, programs include routines, objects, components, data structures and the like that perform particular tasks or implement particular abstract data types. The term "program" as used herein may connote a single program module or multiple program modules acting in concert. The term "computer" or "computing device" as used herein includes any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller and the like. The invention may also be employed in distributed computing environments, where tasks are performed by remote processing devices that are linked through a communications network. In a distributed computing environment, programs may be located in both local and remote memory storage devices.

Figure 1:
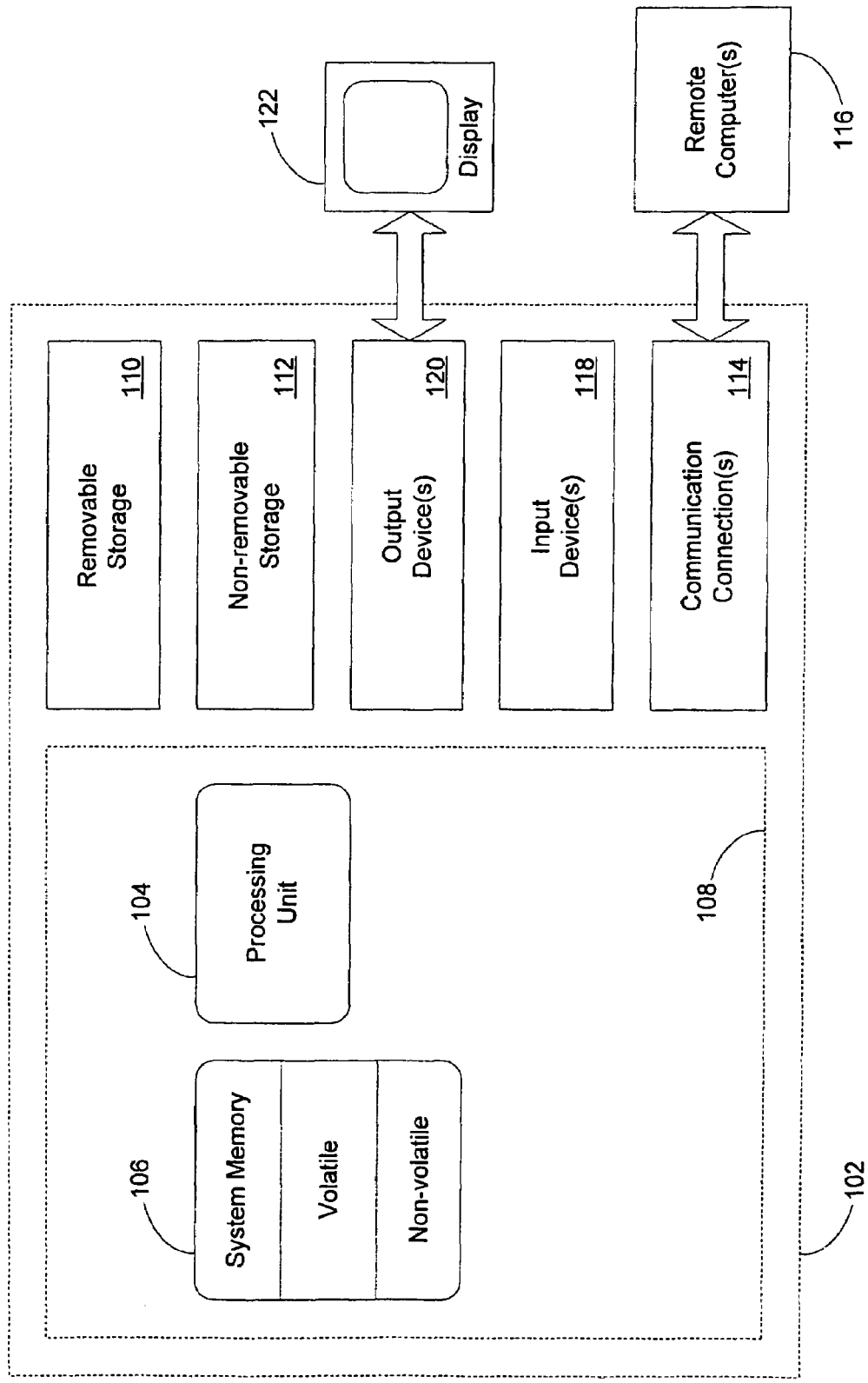
FIG. 1 is a schematic diagram illustrating an exemplary mobile computing device suitable for incorporating aspects of the invention.

Referring to FIG. 1, an example of a basic configuration for a mobile computing device on which aspects of the invention described herein may be implemented is shown. In its most basic configuration, the mobile computing device 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the mobile computing device 102 and to devices outside of the mobile computing device 102 to cause some result. Depending on the exact configuration and type of the mobile computing device 102, the memory 106 may be volatile (such as RAM), non-volatile (such as ROM or flash memory) or some combination of the two. This most basic configuration is illustrated in FIG. 1 by dashed line 108.

The mobile computing device 102 may also have additional features/functionality. For example, mobile computing device 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the mobile computing device 102. Any such computer storage media may be part of mobile computing device 102.

The mobile computing device 102 preferably also contains communications connections 114 that allow the device to communicate with other devices such as remote computing devices 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The mobile computing device 102 may also have input devices 118 such as a keyboard/keypad, mouse, pen, voice input device, touch input device, etc. Output devices 120 such as a display 122, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

A wireless networking environment suitable for incorporating aspects of the invention includes at least two different types of wireless network. At least one of the wireless networks in the wireless networking environment comprises a plurality of wireless network cells. Each wireless network cell has a limited geographical coverage area and comprises at least one wireless network base station or access point (AP). The terms "wireless network base station" and "wireless network access point" are equivalent for the purposes of this description. Typically, a single wireless network access point provides wireless network service to the geographical coverage area of a wireless network cell. However, some wireless networks incorporate more than one access point for each wireless network cell, for example, one access point for each sector of a wireless network cell. For clarity, the description will proceed with reference to the typical case, but a wireless networking environment suitable for incorporating aspects of the invention is not so limited.

The extent of the geographical coverage area of a wireless network cell, i.e., the wireless network cell size, may vary within a wireless network type as well as between types of wireless network. Average wireless network cell size is an example of a wireless network characteristic that differentiates types of wireless network, for example, a wireless wide area network (WWAN) typically has a larger average wireless network cell size than a wireless local area network (WLAN). In what follows, a wireless wide area network and a wireless local area network are utilized as illustrative examples of different wireless network types, however, wireless network cell size need not be a distinguishing feature of the different wireless network types that comprise a wireless networking environment suitable for incorporating aspects of the invention. A key distinguishing feature of a network type is its quality of service (QoS) attributes, for example, bandwidth, data packet delay statistics (in wireless networks where digital data is broken up into data packets), security (including privacy and anti-fraud measures), cost efficiency and the like.

In an embodiment of the invention, the mobile computing device 102 moves through the wireless networking environment. Alternatively, the wireless networking environment may change and the mobile computing device 102 remain stationary. These alternates are equivalent for the purposes of this description. As the mobile computing device 102 moves through the wireless networking environment it may enter and leave the wireless network cells of a single wireless network type as well as the wireless network cells of multiple wireless network types. Transitions between wireless network cells of the same type are carried out utilizing prior art horizontal handoff techniques. In an embodiment of the invention, transitions between wireless network cells of different types are carried out utilizing a vertical handoff method.

Figure 2:
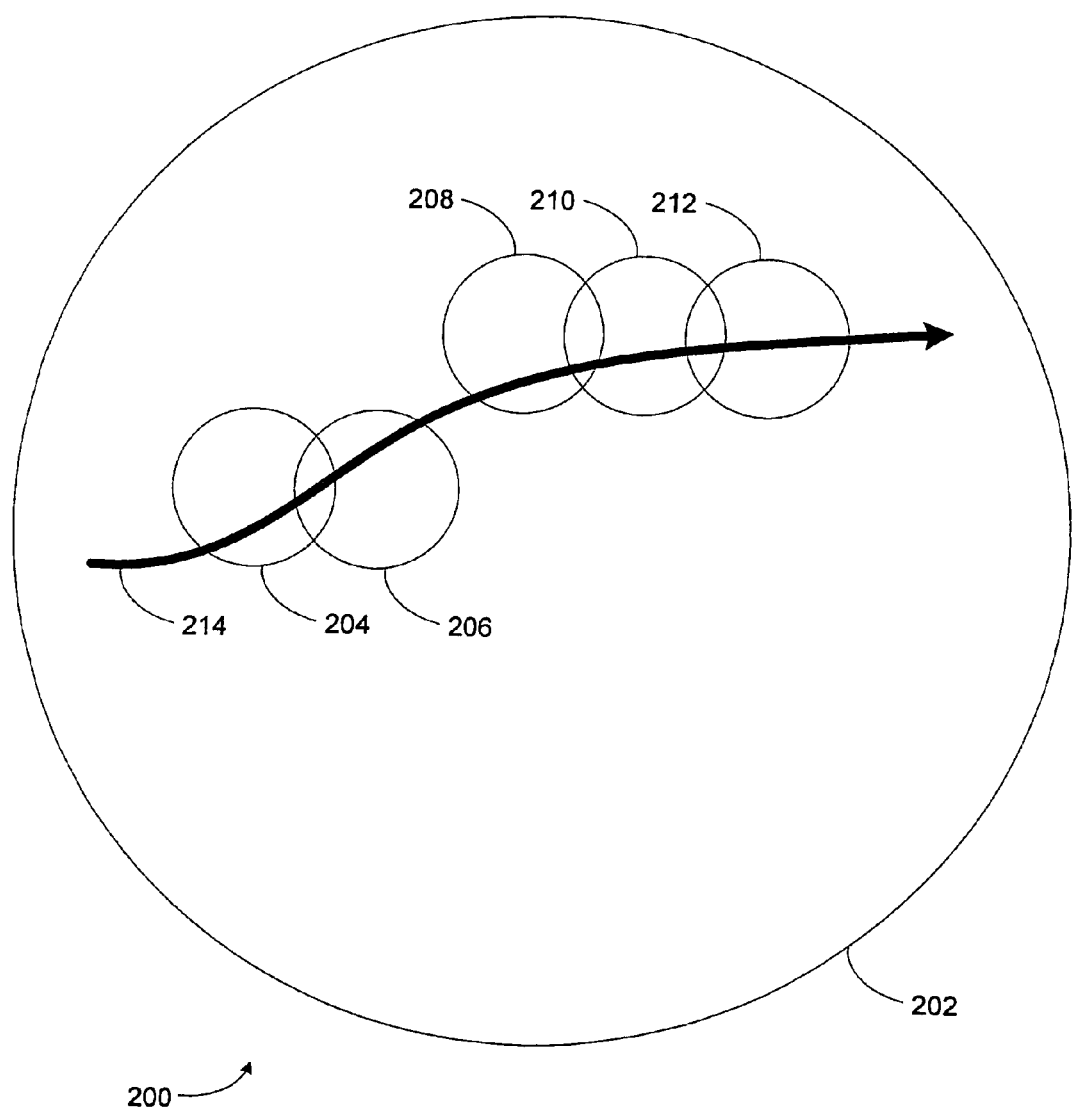
FIG. 2 is a schematic diagram illustrating an exemplary wireless networking environment suitable for incorporating aspects of the invention.

As an illustrative example, FIG. 2 shows a wireless networking environment suitable for incorporating aspects of the invention. The wireless networking environment has two types of wireless network. A large wireless network cell 202 is a part of a first type of wireless network, a wireless wide area network. Five smaller wireless network cells 204, 206, 208, 210, 212 are part of a second type of wireless network, a wireless local area network. In this example, the wireless local area network provides a higher quality of service than the wireless wide area network.

The mobile computing device 102 (not shown in FIG. 2) takes a geographical path 214 through the wireless networking environment 200. The path 214 begins inside the coverage area of wireless network cell 202. At the beginning of the path, the mobile computing device 102 is provided wireless network service by wireless network cell 202, that is, by the wireless wide area network. The next wireless network cell that the mobile computing device 102 encounters as it moves along path 214 is wireless network cell 204, a wireless local area network cell. Once the path 214 enters wireless network cell 204, the mobile computing device 102 has a choice of wireless network types, i.e., the wireless wide area network (via the wireless network cell 202) and the wireless local area network (via the wireless network cell 204).

In accordance with an aspect of the invention, when a choice is available, the mobile computing device 102 is configured to automatically choose the wireless network type that provides the highest quality of service. As the mobile computing device 102 enters wireless network cell 204, it initiates a vertical handoff from the wireless wide area network to the wireless local area network. A vertical handoff from the WWAN cell 202 to the WLAN cell 204 occurs.

As the path 214 reaches the right edge of the first WLAN cell 204, a second wireless local area network cell 206 is encountered. As the path enters the second WLAN cell 206 and leaves the first WLAN cell 204, a prior art horizontal handoff from the first WLAN cell 204 to the second WLAN cell 206 occurs as part of the normal operation of the wireless local area network. Another WLAN cell beyond the edge of the second WLAN cell 206 isn't immediately available, so that when the path 214 moves beyond the edge of the second WLAN cell 206, the wireless local area network is temporarily unable to provide wireless network service to the mobile computing device 102.

In this example, the mobile computing device 102 is configured to maintain wireless network connectivity where possible. When the mobile computing device 102 moves beyond the edge of the second WLAN cell 206, it initiates a second vertical handoff from the wireless local area network back to the wireless wide area network. A vertical handoff from the WLAN cell 206 to the WWAN cell 202 occurs.

Similarly, as the mobile device continues further along the path 214, a vertical handoff from the WWAN cell 202 to the WLAN cell 208 occurs and then prior art horizontal handoffs from the WLAN cell 208 to the WLAN cell 210 and from the WLAN cell 210 to the WLAN cell 212. A final vertical handoff occurs as the path exits the WLAN cell 212. A vertical handoff from the WLAN cell 212 back to the WWAN cell 202 occurs. If the mobile computing device 102 continues to move in the direction indicated, it will exit the WWAN cell 202. If there is another WWAN cell (not shown) adjacent to the WWAN cell 202, a prior art horizontal handoff will occur in the wireless wide area network from the WWAN cell 202 to the neighboring WWAN cell.

Seamless and automatic horizontal handoff between cells within a wireless network type makes the existence of wireless network cells transparent to a wireless network user. It is a desirable feature and well researched in the prior art. Seamless and automatic vertical handoff between different types of wireless network is likewise desirable but the systems and methods of horizontal handoff are not applicable. For example, in horizontal handoff between cells of the same wireless network type, a comparison of the relative signal strengths received at a mobile computing device from two candidate wireless network cell access points is commonly part of the process of making handoff decisions, i.e., if one candidate access point is causing a significantly higher received signal strength at the mobile computing device 102, then a horizontal handoff is initiated to that access point. For the purposes of this description, a handoff to a wireless network cell and a handoff to a wireless network access point that provides service to a wireless network cell are equivalent.

Figure 3:
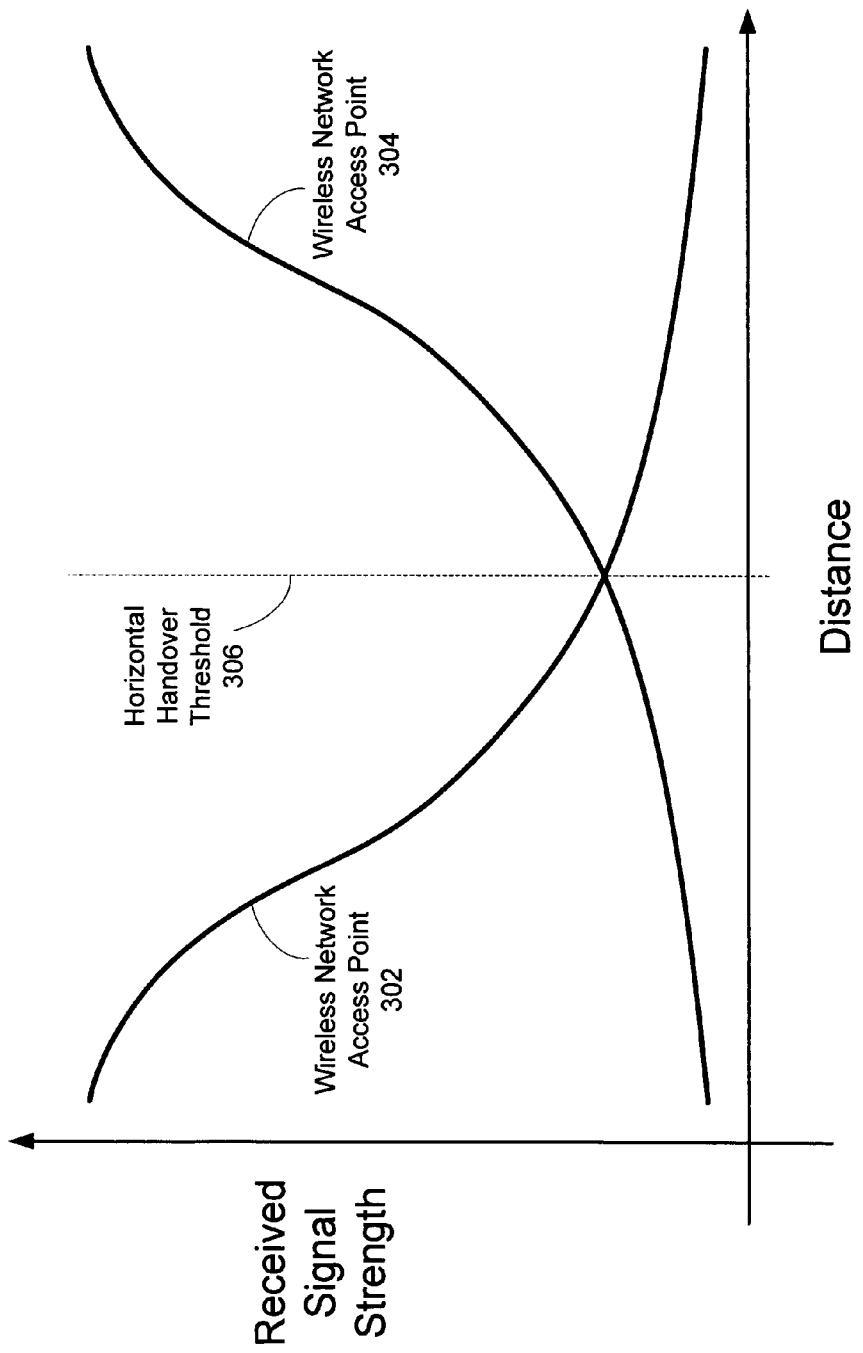
FIG. 3 is a graph illustrating typical variables considered when making prior art horizontal handoff decisions.
Figure 4:
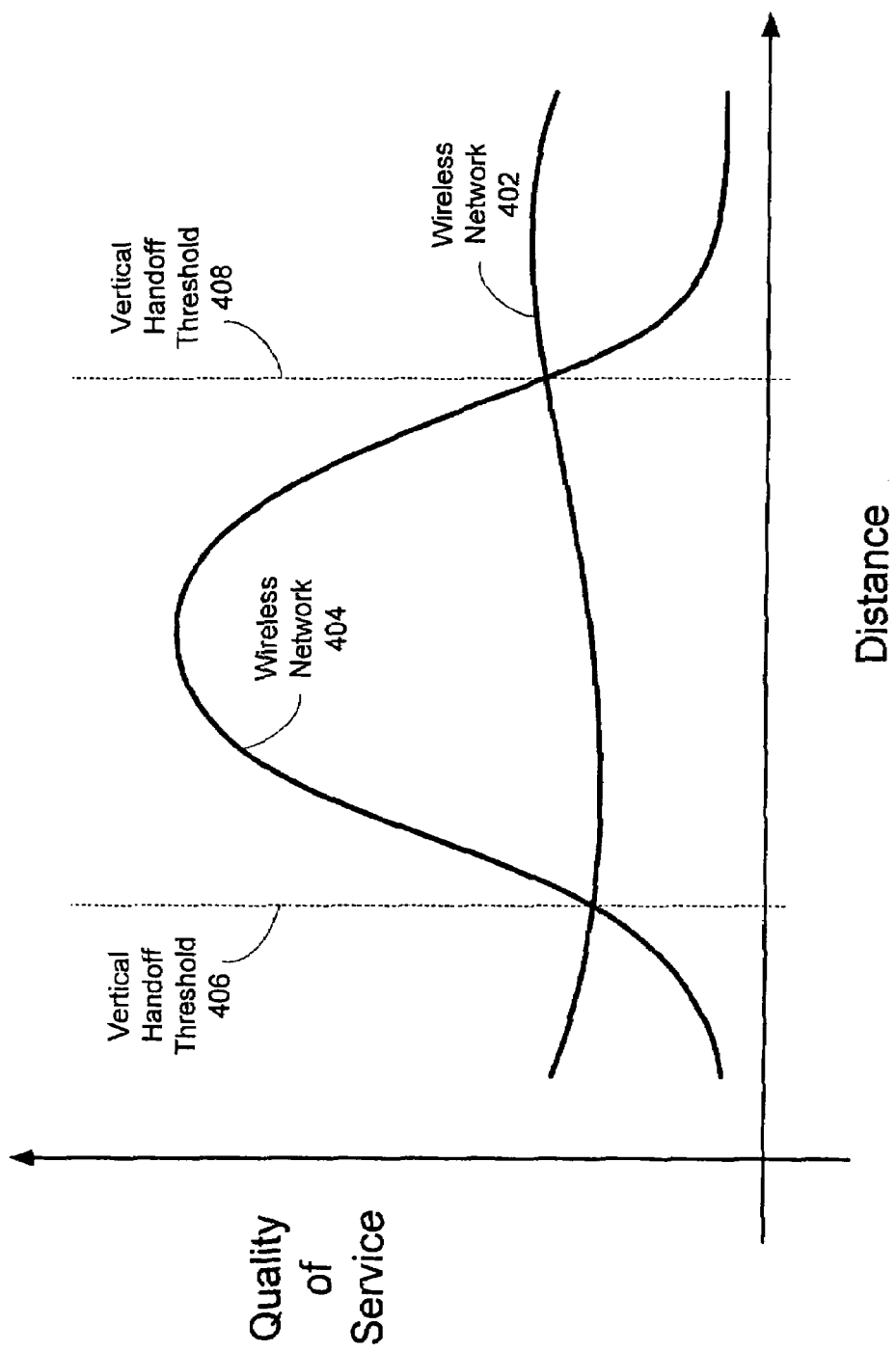
FIG. 4 is a graph illustrating variables that may be considered when making vertical handoff decisions.

One of the reasons that signal strength received at a mobile computing device from wireless network access points ("received signal strength") is a useful comparison for making horizontal handoffs within a wireless network type is because the wireless network access points conform to a single wireless networking standard. However, in a vertical handoff between wireless network types, there are, by definition, a plurality of wireless networking standards. In a vertical handoff between wireless network types, there is typically no guarantee that received signal strength from different wireless network types is a useful comparison for making handoff decisions. A suitable level of received signal strength in one wireless network type may be unsuitable in another wireless network type. In an embodiment of the invention, criteria corresponding to quality of service provided by a wireless network are considered when making vertical handoff decisions. FIGS. 3 and 4 help illustrate some of the differences between the two problems.

FIG. 3 shows a graph of signal strength received at the mobile computing device 102 from two wireless network access points 302, 304 within a wireless network type as the mobile computing device 102 moves through a geographical distance. At the left hand side of the graph, the signal strength received at the mobile computing device 102 from the first wireless network access point 302 is strong (i.e., relatively high) and the signal strength received at the mobile computing device 102 from the second wireless network access point 304 is weak (i.e., relatively low). At the right hand side of the graph, the received signal strength from the second wireless network access point 304 is strong and the received signal strength from the first wireless network access point 302 is weak.

In the center of the graph shown in FIG. 3, there is a point where the signal strength received at the mobile computing device 102 from both wireless network access points is equal. This point commonly marks a threshold 306 in the horizontal handover decision making process. To the left of the threshold 306, it is theoretically more desirable for wireless network access point 302 to provide wireless network service to the mobile computing device 102. To the right of the threshold 306, it is theoretically more desirable for wireless network access point 304 to provide wireless network service to the mobile computing device 102. Several practical considerations contribute to the decision to initiate a horizontal handover but these are well known in the art and need not be detailed here. FIG. 3 is included here to provide contrast for FIG. 4.

FIG. 4 shows the quality of wireless network service provided to the mobile computing device 102 by two different types of wireless network 402, 404 as the mobile computing device 102 moves through a geographical distance. The wireless network 402 may represent, for example, a wireless wide area network, and the wireless network 404 may similarly represent a wireless local area network. At the left hand side of the graph, the quality of service provided to the mobile computing device 102 by the first type of wireless network 402 is relatively high and the quality of service provided to the mobile computing device 102 by the second type of wireless network 404 is relatively low. The same is true in a different geographic location at the right hand side of the graph. In the center portion of the graph, the quality of service provided by the second type of wireless network 404 increases dramatically so that the second type of wireless network 404 provides a higher quality of service than the first type of wireless network 402.

There are two points in the graph shown in FIG. 4 where both wireless network types are able to provide an equal quality of service to the mobile computing device 102. Ideally, these two points mark vertical handoff decision thresholds 406, 408. To the left of the left hand threshold 406 and to the right of the right hand threshold 408, it is desirable that the first type of wireless network 402 provide wireless network service to the mobile computing device 102. Between these two thresholds 406, 408, it is desirable that the second type of wireless network 404 provide wireless network service to the mobile computing device 102.

In an embodiment of the invention, there are at least two types of automatic vertical handoff decision, including: automatically deciding when to enter a potentially higher quality of service wireless network (e.g., WLAN) from a lower quality of service wireless network (e.g., WWAN), and automatically deciding when to exit a potentially higher quality of service network to a lower quality of service network. In the first case of entering a potentially higher quality of service wireless network, a primary goal of the handoff is to actually achieve a higher quality of service, for example, that the wireless network bandwidth available to the mobile computing device 102 is actually higher after the vertical handoff than before. In an embodiment of the invention, achieving this first case goal comprises enabling the mobile computing device 102 to measure wireless medium access control (MAC) layer quality of service attributes, such as residual communications bandwidth in the wireless medium and wireless medium access control transmission delay.

In the second case of leaving a potentially higher quality of service wireless network, there are at least two competing goals: to handoff before the higher quality of service wireless network is no longer able to provide service, but also to remain in the potentially higher quality of service wireless network while that wireless network is actually able to provide a higher quality of service. As opposed to a gradual decrease in quality of service, a modern digital wireless network is typically able to maintain a relatively high quality of service throughout a wireless network cell coverage area until close to the cell boundary where the quality of service drops precipitously. In an embodiment of the invention, achieving these second case goals comprises enabling the mobile computing device 102 to detect an approaching wireless network cell boundary from the dynamic history of the signal strength received from the wireless network access point currently providing service to the mobile computing device 102, that is, without the benefit of simultaneous reference to the received signal strength of a candidate wireless network cell for direct comparison.

An unnecessary vertical handoff is an automatic vertical handoff that does not result in an increased quality of wireless network service provided to the mobile computing device 102, for example, because entering a potentially higher quality of service wireless network does not yield the expected gain in quality of service, or for example, because a higher quality of service wireless network is exited prematurely and the decision is made quickly to return to the higher quality of service wireless network. Each vertical handoff generally has some communications protocol overhead so that, in an embodiment of the invention, a high rate of unnecessary vertical handoff has a negative impact on the overall quality of wireless network service provided to the mobile computing device 102. It is important then, that the two types of vertical handoff decision described above, that is, deciding when to enter a potentially higher quality of service wireless network, and deciding when to exit a potentially higher quality of service network, in addition to achieving their individual goals, work in tandem to reduce the rate of unnecessary vertical handoff.

It is common for a wireless network cell to provide wireless network service to more than one mobile computing device simultaneously. Typically, a particular type of wireless network is allocated some portion of the available wireless spectrum and has some scheme for sharing the allocated spectrum among its users. A common scheme is to divide the allocated spectrum into one or more communication channels, a basic characteristic of which is that only one sender and one receiver can use a particular communication channel to communicate during a particular period of time.

For the purposes of this description, it is sufficient to distinguish between two types of channel allocation scheme: dedicated and shared. Some types of wireless network dedicate one or more channels to each mobile computing device in a wireless network cell, e.g., a wireless network conforming to the GPRS standard. Disadvantages of this scheme include that each channel typically has a relatively low communications bandwidth and that it is generally cost inefficient. Advantages of this scheme include that its quality of service characteristics, such as bandwidth and transmission delay, are generally predictable in advance and relatively constant during use.

Other types of wireless network share the bandwidth of each communications channel among multiple mobile computing devices, e.g., a wireless network conforming to the IEEE 802.11b standard. Advantages of this scheme include that each channel typically has a relatively high communications bandwidth and that it is generally cost efficient. Disadvantages of this scheme include that its quality of service characteristics, such as available bandwidth and transmission delay, are not generally predictable in advance and typically vary during a communications session, particularly if the number of mobile computing devices attempting to share the communications channel varies. In addition, some further scheme is desirable in order to avoid transmission collisions in a shared channel, i.e., two mobile computing devices transmitting over the same channel at the same time. A transmission collision typically results in none of the senders involved being able to successfully transmit data.

A common collision avoidance scheme is to provide, as part of the wireless medium access control (MAC) layer of the wireless network communications protocol, that a sender first advertise on a communications channel how long a transmission will take. Other senders that share the communications channel then avoid transmitting during this time. For example, the network allocation vector (NAV) transmitted as part of a request to send (RTS) protocol message is the advertised transmission time in a wireless network conforming to the IEEE 802.11b standard.

In an embodiment of the invention, the ratio of a cumulative advertised transmission time during an observation period to a total observation time serves as a wireless network quality of service measure in a wireless network that shares communication channels and utilizes advertised transmission time as part of a collision avoidance scheme. For example, in a wireless network conforming to the IEEE 802.11b standard, a mobile computing device in accordance with an embodiment of the invention monitors the network allocation vector (NAV) maintained by its network interface for a period of time (e.g., 2 seconds). A network allocation vector occupation (NAVO) is calculated as the ratio of the amount of time for which the network allocation vector indicates that the wireless network is busy during the monitoring period to the total amount of time during the monitoring period. The term "network allocation vector occupation" is used as shorthand for "ratio of cumulative advertised transmission time during an observation period to the total observation time."

In an embodiment of the invention, the calculated network allocation vector occupation serves directly as a measure of the quality of service provided by a wireless network. One of the reasons that network allocation vector occupation is a useful measure of the quality of service provided by a wireless network is that it is relatively insensitive to the number of wireless network users and to data traffic patterns (e.g., steady versus "bursty"). In a preferred embodiment of the invention, network allocation vector occupation is further mapped to more traditional quality of service measures such as residual communications bandwidth in the wireless medium and wireless medium access control transmission delay. There follows examples of mapping network allocation vector occupation to a particular wireless network quality of service measure, i.e., residual bandwidth in the wireless network. As will be apparent to those of skill in the art, such mapping techniques are applicable to other wireless network quality of service measures.

Figure 5:
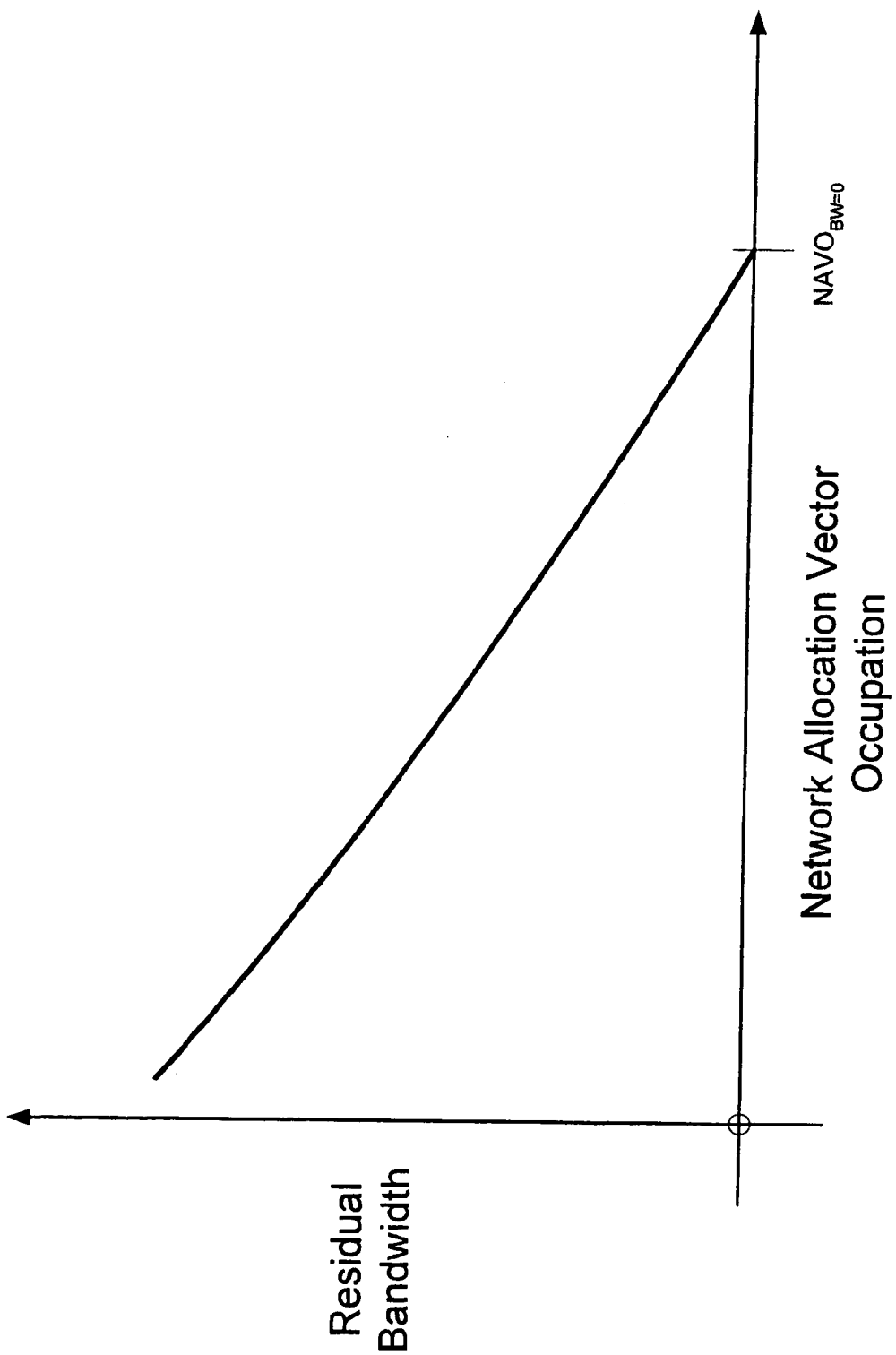
FIG. 5 is a graph illustrating a relationship between a measured network allocation vector occupation and available bandwidth in a wireless network in accordance with an embodiment of the invention.

FIG. 5 is a graph illustrating a relationship between measured network allocation vector occupation and estimated residual bandwidth in a wireless network. The horizontal axis of the graph is measured network allocation vector occupation. The vertical axis of the graph is estimated residual bandwidth. A low network allocation vector occupation corresponds to a high estimated residual bandwidth. A high network allocation vector occupation corresponds to a low estimated residual bandwidth. There is a high network allocation vector occupation value $NAVO_{BW=0}$ (e.g., 65%) that corresponds to an estimated residual bandwidth value of zero.

In an embodiment of the invention, estimated residual bandwidth in a wireless network is calculated as a linear function of network allocation vector occupation, for example, $BW=BW_{max}-f*NAVO$; where BW is estimated residual bandwidth in a wireless network, $BW_{max}$ is a maximum estimated residual bandwidth (e.g., 3.3 Mbps at 0% network allocation vector occupation), f is a network allocation vector occupation to estimated residual bandwidth mapping factor (e.g., 5, corresponding to a 0.5 Mbps drop for a 10% increase in network allocation vector occupation), and NAVO is the measured network allocation vector occupation. The example values given are valid for a particular average data packet size and wireless network type, e.g., 1000 byte packet size in a wireless network conforming with the IEEE 802.11b wireless network standard that has the Request to Send (RTS) aspect of the IEEE 802.11b protocol enabled.

In an alternative embodiment of the invention, the mapping from network allocation vector occupation to estimated residual bandwidth is accomplished with a look-up table. The table below provides an example of part of such a look-up table. In the look-up table shown below, the top row lists values of network allocation vector occupation, the leftmost column lists values of average data packet transmission size and the body of the table sets out the corresponding estimated residual bandwidth values. For example, for an average data packet transmission size of 1000 bytes and a measured network allocation vector occupation of 50%, the estimated residual bandwidth in the wireless network is 0.8 Mbps.

|  | 20% | 30% | 40% | 50% | 60% | >65% |
|---|---|---|---|---|---|---|
| 250 Bytes | 0.86 Mbps | 0.66 Mbps | 0.50 Mbps | 0.30 Mbps | 0.10 Mbps | 0.00 Mbps |
| 500 Bytes | 1.55 Mbps | 1.10 Mbps | 0.80 Mbps | 0.50 Mbps | 0.15 Mbps | 0.00 Mbps |
| 750 Bytes | 1.90 Mbps | 1.45 Mbps | 1.05 Mbps | 0.65 Mbps | 0.20 Mbps | 0.00 Mbps |
| 1000 Bytes | 2.30 Mbps | 1.80 Mbps | 1.30 Mbps | 0.80 Mbps | 0.30 Mbps | 0.00 Mbps |

The values of such a look-up table and/or the parameters of the linear mapping function may be obtained for a particular wireless network type by generating known levels of residual bandwidth in a suitable test wireless network or wireless network simulator and then recording the observed/simulated network allocation vector occupation at each level. Such techniques are well known in the art and need not be covered here in detail.

In wireless networks where the network allocation vector occupation cannot be calculated, e.g., a network allocation vector is not available, an alternative quality of service measure is needed. A common aspect of a communications protocol in a wireless network that transmits data in packets, is an acknowledgement provision. The acknowledgement provision provides that a receiver of data packets is capable of sending an acknowledgment of each data packet received. When exploiting the acknowledgement provision, it is assumed by a sender that an unacknowledged packet was lost (i.e., was not received at its intended destination) and should be retransmitted. Transmission collision is a common cause of packet loss in a wireless network without collision avoidance mechanisms such as advertised transmission time.

In an embodiment of the invention, data packet collision probability (PCP) also serves as a wireless network quality of service measure. In an embodiment of the invention, data packet collision probability is calculated as follows. The mobile computing device 102 transmits probing data packets of a known size (e.g., 1000 bytes) at a known rate (e.g., 100 per second) for a known period of time (e.g., 1 second). The data packet collision probability is calculated as the ratio of the number of unacknowledged probing data packets to the total number of transmitted probing data packets.

For example, if the mobile computing device 102 transmits the probing data packets to an wireless network access point in compliance with the IEEE 802.11b standard, utilizing a network interface in compliance with a wireless Network Device Interface Standard (NDIS), then the data packet collision probability may be calculated as the ratio of the Acknowledgement Failure Count NDIS statistic (i.e., a statistic representing the number of unacknowledged probing data packets) to the sum of the Acknowledgement Failure Count and Transmitted Fragment Count NDIS statistics (i.e., the sum of the statistics representing the unacknowledged and acknowledged probing data packets). This example also shows that data packet collision probability may serve as a wireless network quality of service measure even in wireless networks that do provide for senders to advertise transmission time.

Figure 6:
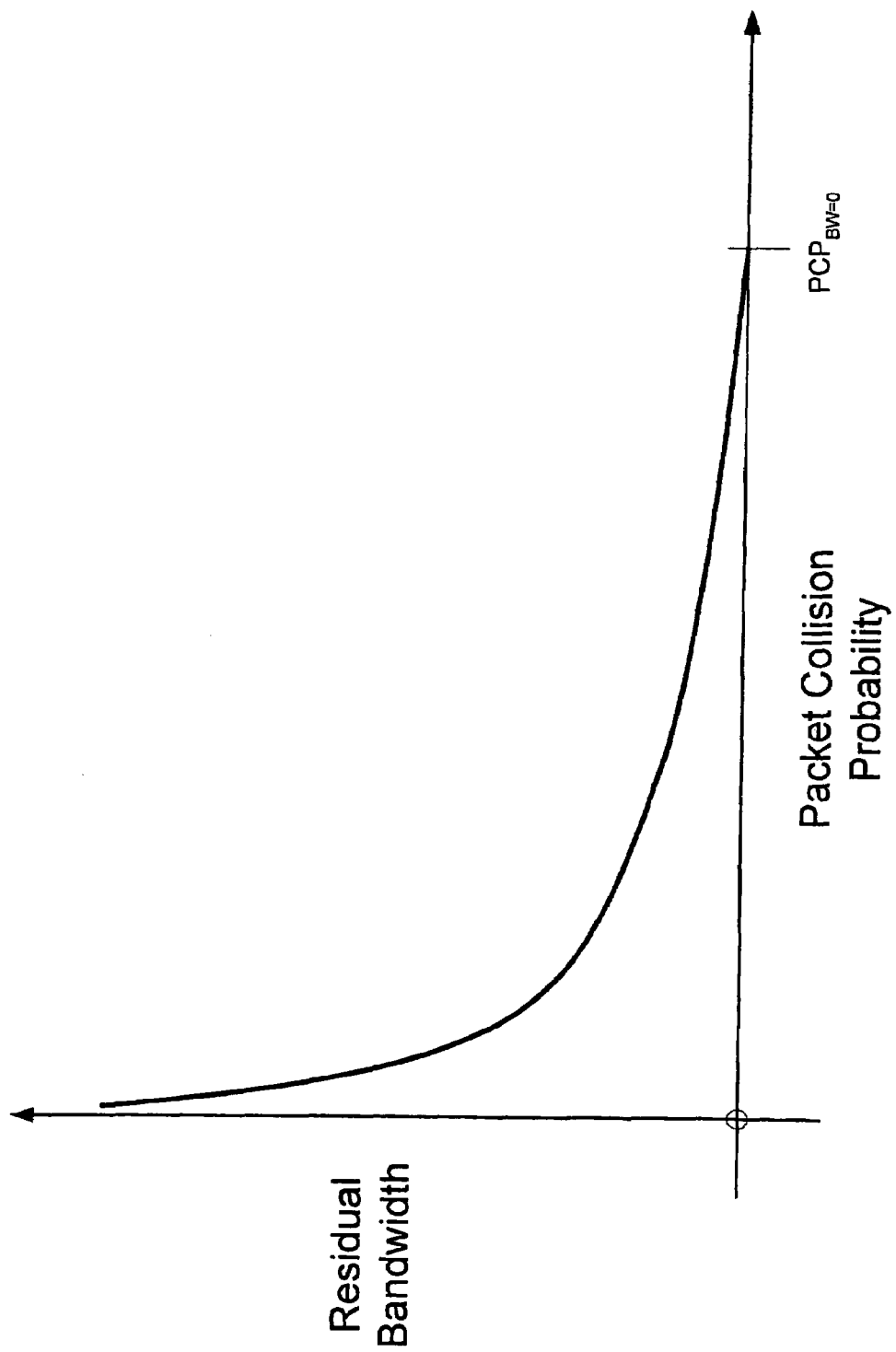
FIG. 6 is a graph illustrating a relationship between a measured data packet collision probability and available bandwidth in a wireless network in accordance with an embodiment of the invention.

FIG. 6 is a graph illustrating a relationship between data packet collision probability and estimated residual bandwidth in a wireless network. The horizontal axis of the graph is measured data packet collision probability. The vertical axis of the graph is estimated residual bandwidth. A low data packet collision probability corresponds to a high estimated residual bandwidth. A high data packet collision probability corresponds to a low estimated residual bandwidth. There is a high data packet collision probability $PCP_{BW=0}$ (e.g., 30%) that corresponds to an estimated residual bandwidth of zero. Similar graphs may be constructed mapping data packet collision probability to other quality of service measures.

As with network allocation vector occupation, in an embodiment of the invention, data packet collision probability is further mapped to more traditional quality of service measures using a mapping relationship such as the example shown in FIG. 6. Linear mapping functions are less suitable for data packet collision probability but not unusable because the section of the mapping curve that is typically of interest for making vertical handoff decisions is the low bandwidth section, which is near-linear. Those of skill in the art will appreciate that non-linear mapping functions, such as exponential mapping functions, may be utilized in this role. In an embodiment of the invention, the mapping from data packet collision probability to, for example, estimated residual bandwidth, is accomplished with a look-up table. The look-up table is populated in a manner similar to that for network allocation vector occupation.

In an embodiment of the invention, wireless network quality of service measures are useful to the mobile computing device 102 for automatically deciding when to enter a high quality of service wireless network. Once within a high quality of service wireless network, in an embodiment of the invention, the ability for the mobile computing device 102 to reliably detect an approaching wireless network cell boundary becomes more important.

Prior art systems have used simple thresholds to detect wireless network cell boundaries. If the received signal strength at the mobile computing device 102 always varied smoothly, simple thresholds would work well, but in practice and particularly near wireless network cell boundaries, received signal strength at the mobile computing device 102 may vary rapidly and significantly (e.g., throughout a 10 dB range) so that simple thresholds are often tripped prematurely by, for example, sharp downward spikes in received signal strength. If the mobile computing device 102 is within a high quality of service network (e.g., WLAN) and a crossing of the simple threshold triggers a vertical handoff, then the mobile computing device 102 will prematurely lose the benefit of the high quality of service wireless network. If a vertical handoff decision algorithm is such that a vertical handoff back to the high quality of service wireless network is triggered by, for example, the received signal strength rising back above the simple threshold, then a high rate of unnecessary vertical handoff may result. Rather than improving the overall quality of service experienced by a wireless network user, overhead associated with a high rate of vertical handoff may result in overall quality of service degradation.

Figure 7:
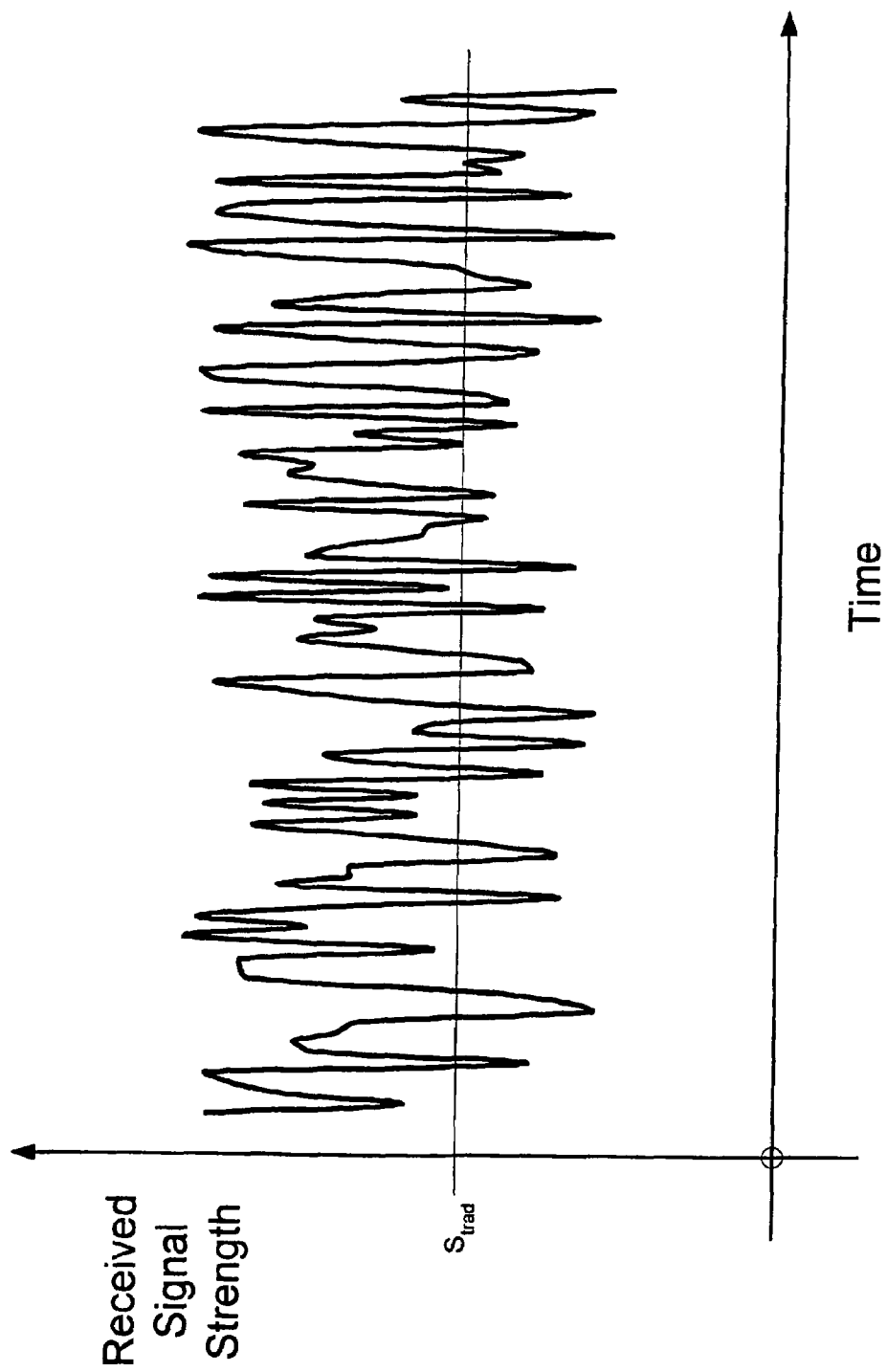
FIG. 7 is a graph illustrating a received wireless network signal strength that varies without a large change in the quality of service provided by the associated wireless networking service.

FIG. 7 illustrates received signal strength at the mobile computing device 102 varying rapidly and significantly over time. In the shown example, the mobile computing device 102 is moving within a high quality of service wireless network. The quality of service provided by the wireless network is relatively stable (despite the varying received signal strength) and from the point of view of the wireless network user, vertical handoffs are undesirable during the time period shown. The received signal strength crosses a simple threshold $S_{trad}$ multiple times. In a prior art system that uses a simple threshold to trigger vertical handoffs, a vertical handoff will be triggered early in the time period shown. Once the received signal strength rises back above the simple threshold $S_{trad}$, the prior art system may decide to initiate a vertical handoff back to the high quality of service wireless network. In that case, many vertical handoffs will be triggered during the time period by the simple threshold $S_{trad}$ where none (or at best, few) were desirable.

In an embodiment of the invention, wireless network cell boundary detection is enhanced by determining that a rapidly and significantly varying received signal strength is in fact decreasing (i.e., that a wireless network cell boundary is approaching) by utilizing a Fourier transform based method as follows. The recent received signal strength history (e.g., the past 4 sec) undergoes a Discrete Fourier Transform, for example, a Fast Fourier Transform (FFT). The Fourier transform and its variants are well known in the art and need not be detailed here. The fundamental term of the transform is a complex number with real and imaginary parts (i.e., a number of the form a+ib; where a is the real part, b is the imaginary part and i is the square root of −1). For clarity, the equation for the imaginary part of the fundamental term is given here:

$$\operatorname{Im}\{X_1\} = \frac{1}{N}\sum_{n=0}^{N-1} x(n)\sin\left(-\frac{2\pi n}{N}\right)$$

where $X_1$ denotes the fundamental term of the Discrete Fourier Transform, $\operatorname{Im}\{X_1\}$ denotes the imaginary part of $X_1$, x(n) is the received signal strength history, and N is the number of discrete samples in the history. In an embodiment of the invention, if the imaginary part of the fundament term is negative and less than a Fourier domain threshold (e.g., −0.6), then the received signal strength is determined to be decreasing.

Figure 8A:
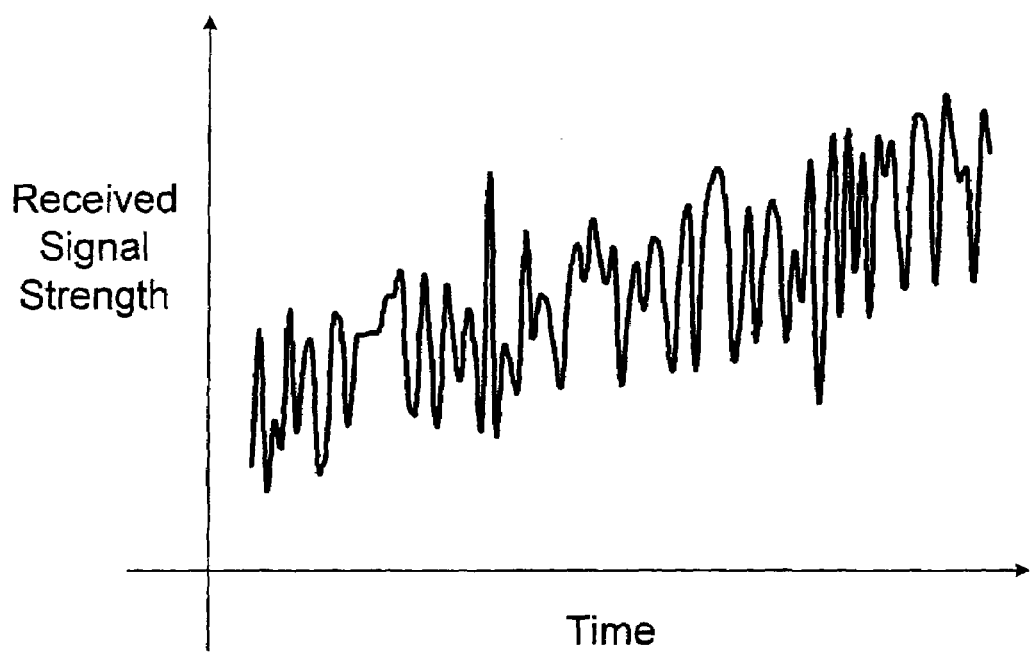
FIG. 8A is a graph illustrating a received wireless network signal strength that increases over time.
Figure 8B:
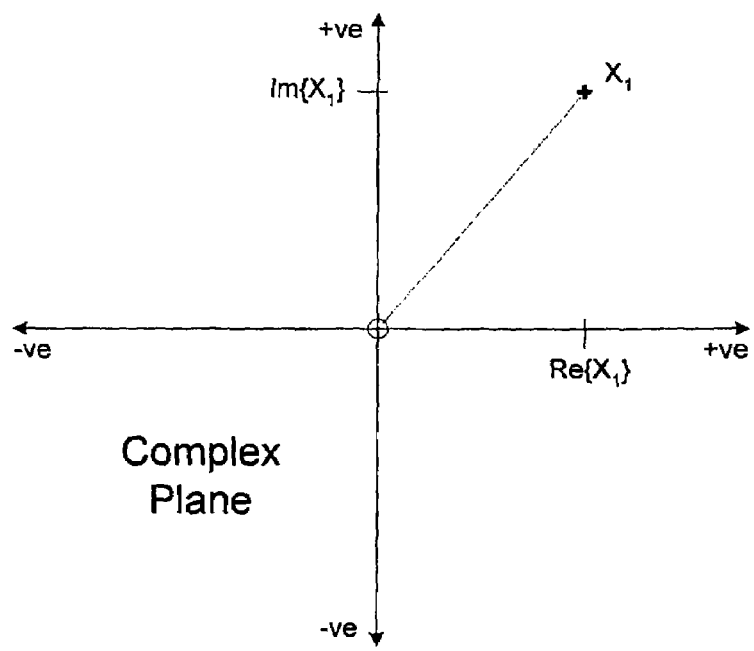
FIG. 8B is a graph illustrating, in accordance with an embodiment of the invention, the fundamental term of a Fourier transform of a received wireless network signal strength that increases over time, plotted in the complex plane.

FIG. 8A shows a received signal strength that is increasing over time. For example, this may occur when the mobile computing device 102 within a wireless network cell moves away from the wireless network cell boundary and toward the center of the wireless network cell. FIG. 8B shows the fundamental term $X_1$ of a Fourier transform of a received signal strength that is increasing over time, such as that shown in FIG. 8A, plotted in the complex plane. The horizontal axis is the magnitude of the real part of a complex number. The vertical axis is the magnitude of the imaginary part of the complex number. In this illustrative example, the fundamental term $X_1$ is located in the quadrant of the complex plane where both the real part of the fundamental term $\operatorname{Re}\{X_1\}$ and the imaginary part of the fundamental term $\operatorname{Im}\{X_1\}$ are positive.

Figure 8C:
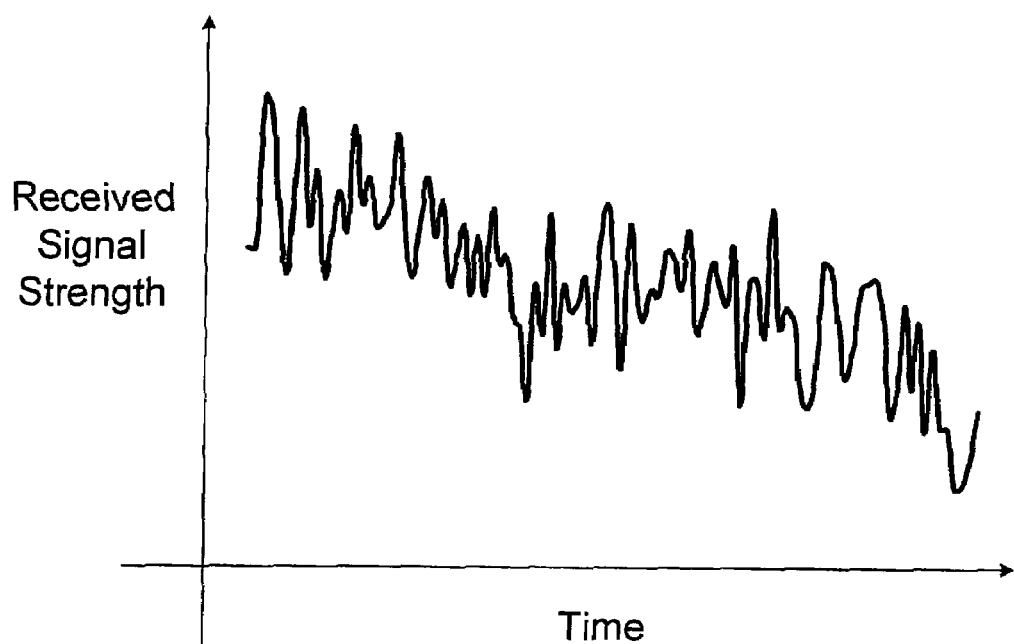
FIG. 8C is a graph illustrating a received wireless network signal strength that decreases over time.
Figure 8D:
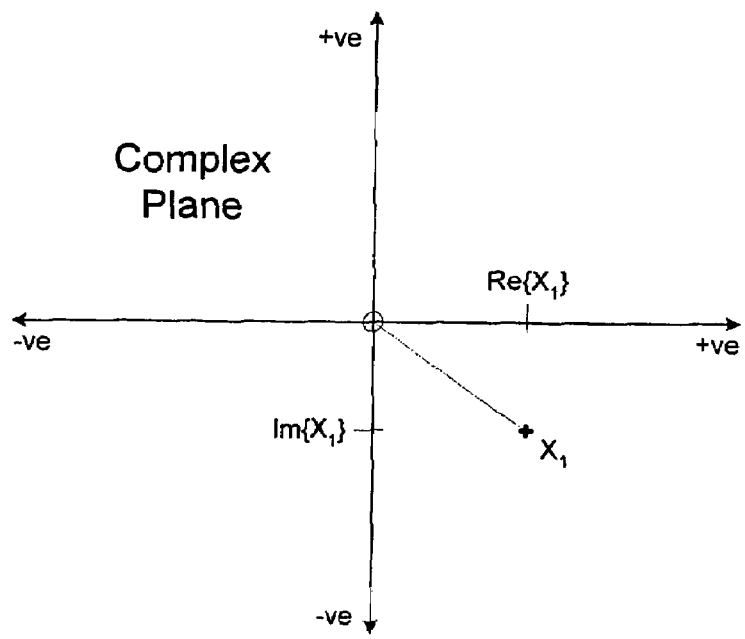
FIG. 8D is a graph illustrating, in accordance with an embodiment of the invention, the fundamental term of a Fourier transform of a received wireless network signal strength that decreases over time, plotted in the complex plane.

FIG. 8C shows a received signal strength that is decreasing over time. For example, this may occur when the mobile computing device 102 within a wireless network cell moves towards a the wireless network cell boundary. FIG. 8D shows the fundamental term $X_1$ of a Fourier transform of a received signal strength that is decreasing over time, such as that shown in FIG. 8C, plotted in the complex plane. Once again, the horizontal axis is the magnitude of the real part of a complex number and the vertical axis is the magnitude of the imaginary part of the complex number. In this illustrative example, the fundamental term $X_1$ is located in the quadrant of the complex plane where the real part of the fundamental term $\operatorname{Re}\{X_1\}$ is positive, but the imaginary part of the fundamental term $\operatorname{Im}\{X_1\}$ is negative. If the imaginary part of the fundamental term $\operatorname{Im}\{X_1\}$ is less than a Fourier domain threshold (not shown) then, in an embodiment of the invention, the mobile computing device 102 determines that the received signal strength is decreasing.

In an embodiment of the invention, the Fourier transform based method is utilized by the mobile computing device 102 to determine that the signal strength received from a wireless network access point is decreasing and so potentially heading towards the minimum signal strength at which the wireless network access point is able to provide service to the mobile computing device 102 ("minimum operating signal strength"), i.e., the wireless network cell boundary. Each wireless networking standard typically specifies a nominal minimum operating signal strength, above which a wireless network interface must be able to provide wireless network service in order to comply with the standard. However, modern network interface hardware is typically able to continue to provide wireless network service at significantly lower signal strength levels (e.g., more than 10 dB lower) than is specified in the wireless networking standard.

In an embodiment of the invention, a goal in deciding when to initiate a vertical handoff from a high quality of service wireless network is to initiate a vertical handoff before the high quality of service wireless network is no longer able to provide service, but to stay in the high quality of service wireless network as long as possible otherwise. If the nominal minimum operating signal strength specified by a wireless network standard is utilized as the received signal strength threshold before which a vertical handoff should be initiated, the vertical handoff may be premature, depriving the mobile computing device 102 of the benefit of the high quality of service wireless network even though it was still able to provide service.

In an embodiment of the invention, actual minimum operating signal strength for a particular network interface is determined adaptively as follows. The signal strength received at the network interface of the mobile computing device 102 is periodically sampled. If the wireless network is able to provide service for some period of time (e.g., 1 second), for example, as indicated by maintaining a valid basic service set identifier (BSSID) in an 802.11b wireless network, then the maximum received signal strength during the period is compared to the current minimum operating signal strength configured for the network interface. If the maximum received signal strength during the period is less than the current minimum operating signal strength configured for the network interface, then the minimum operating signal strength for the network interface is set to the maximum received signal strength during the period.

Figure 9:
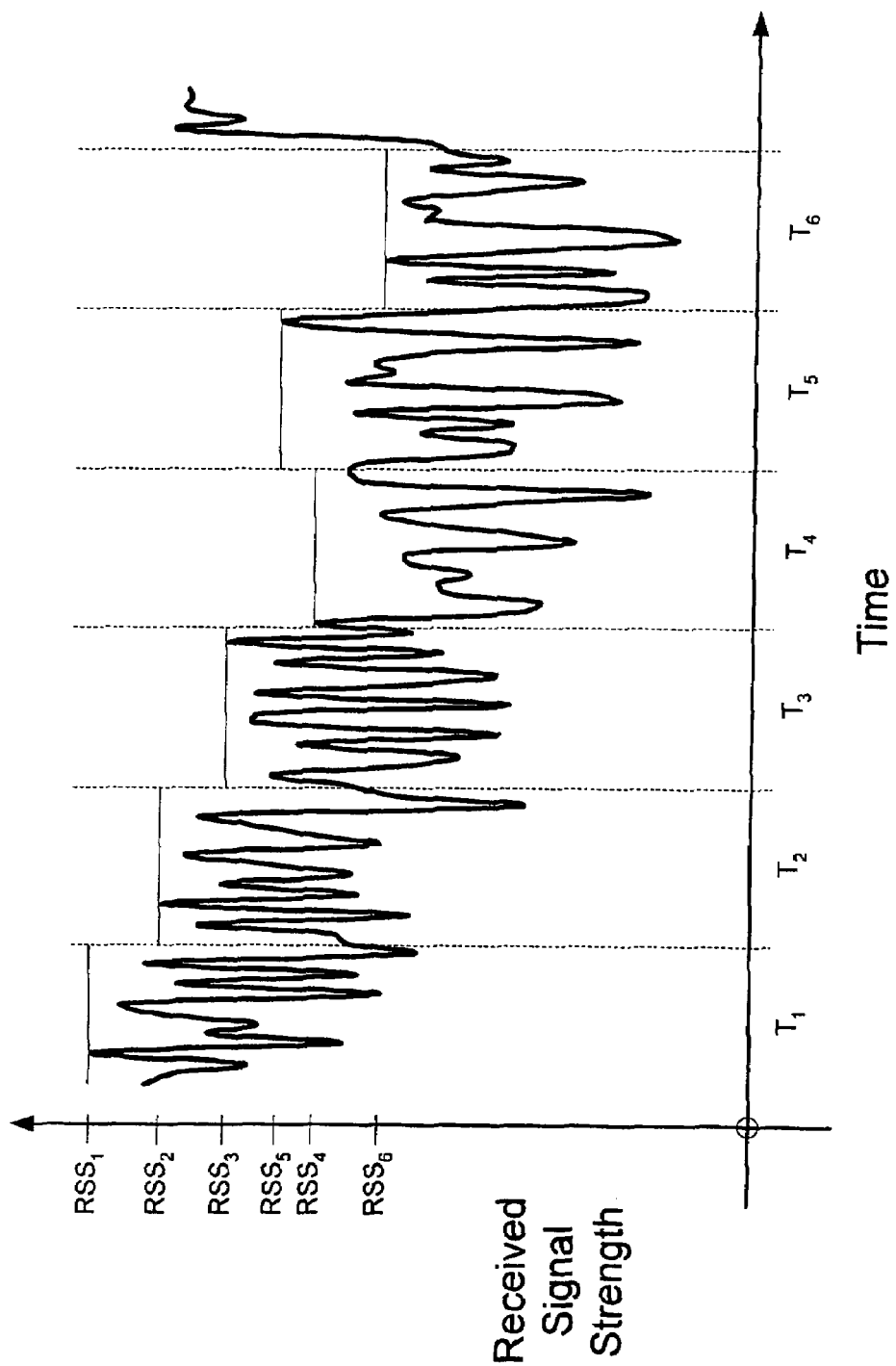
FIG. 9 is a graph illustrating a received wireless network signal strength that varies without the associated wireless networking service becoming unavailable, the maximum signal strength during each time period is marked in accordance with an embodiment of the invention.

FIG. 9 illustrates a signal strength received at a particular network interface of the mobile computing device 102. The wireless network is able to provide service to the network interface throughout the time period illustrated in FIG. 9. During a first sampling period $T_1$, the maximum received signal strength $RSS_1$ is less than the configured minimum operating signal strength for the network interface (not shown). The minimum operating signal strength for the network interface is changed (i.e., reduced) to the maximum received signal strength $RSS_1$ after the first sampling period $T_1$. During a second sampling period $T_2$, the maximum received signal strength $RSS_2$ is again less than the configured minimum operating signal strength for the network interface. Again the minimum operating signal strength for the network interface is set to the lower value $RSS_2$. The same is true for the next two sampling periods $T_3$, $T_4$. The minimum operating signal strength for the network interface is set to the maximum received signal strengths during those periods: $RSS_3$ and $RSS_4$ respectively.

Still referring to FIG. 9, the maximum received signal strength $RSS_5$ during sampling period $T_5$ is higher than the configured minimum operating signal strength for the network interface (i.e., $RSS_4$ at that time), and so the minimum operating signal strength is not lowered after sampling period $T_5$. During sampling period $T_6$, the maximum received signal strength $RSS_6$ is once again lower than the configured minimum operating signal strength and so once again, the minimum operating signal strength is lowered to the maximum received signal strength $RSS_6$ during the sampling period $T_6$. Although this example shows the configured minimum operating signal strength for a network interface being lowered multiple times in succession, in an embodiment of the invention, this typically only occurs during an initial adaptation phase, for example, following first use of a particular network interface or after a reset of the configured minimum operating signal strength to the conservative default of the wireless network standard. After the initial adaptation phase, the situation as described for the fifth sampling period is more common and the configured minimum operating signal strength for a network interface is not often further lowered, that is, a floor is quickly reached (e.g., within 30 seconds).

In an embodiment of the invention, utilizing an adaptively configured minimum operating signal strength threshold as a simple vertical handoff decision threshold may alone significantly reduce the unnecessary vertical handoff rate. In combination with the Fourier transform based method for reliably detecting a decreasing received signal strength, an order of magnitude reduction in the unnecessary vertical handoff rate compared to the prior art simple threshold method of triggering vertical handoffs is not uncommon.

Figure 10:
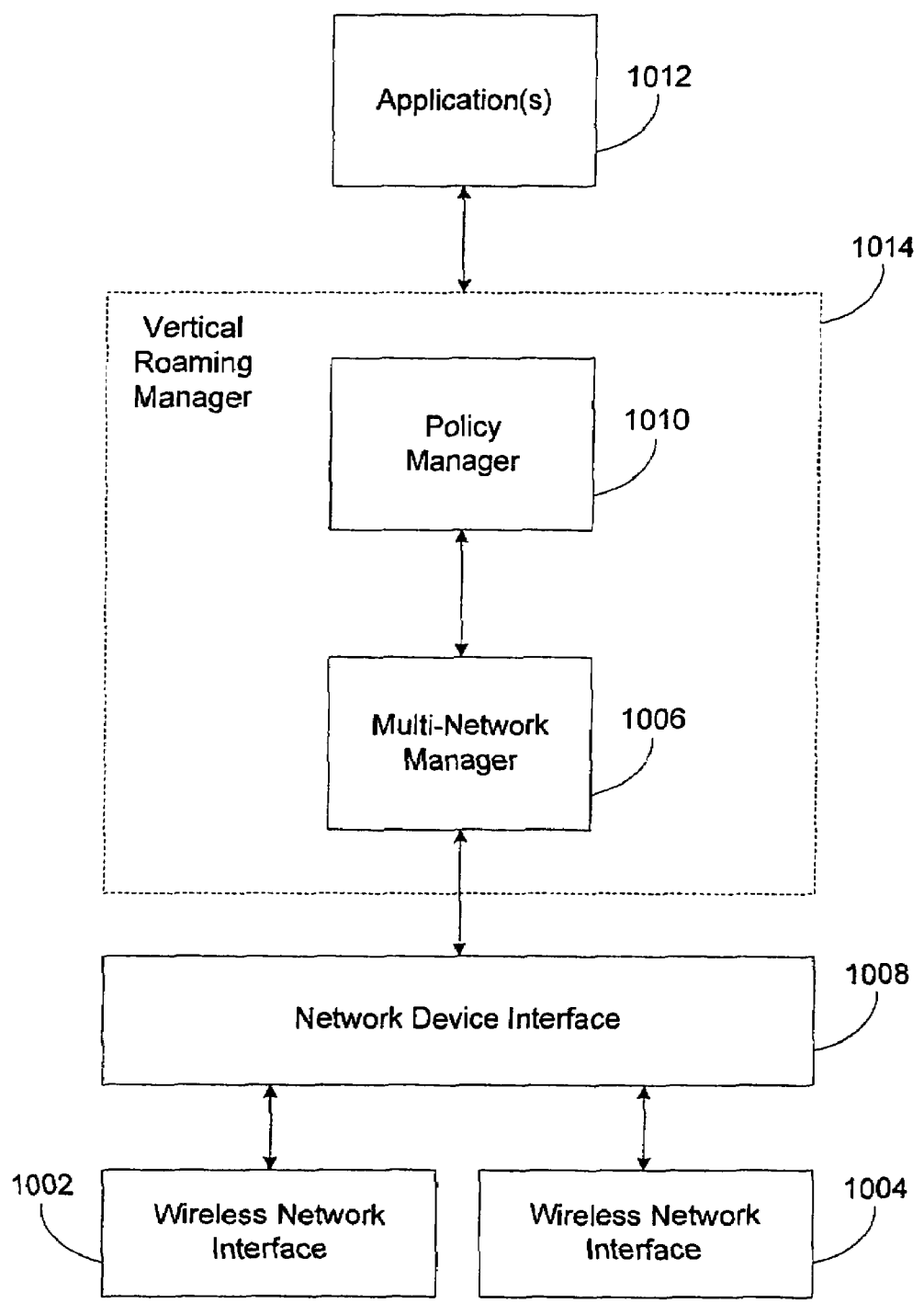
FIG. 10 is a schematic diagram illustrating a component architecture in accordance with an embodiment of the invention.

FIG. 10 depicts an example mobile computing device software component architecture suitable for incorporating aspects of the invention. The example architecture includes a first wireless network interface 1002 and a second wireless network interface 1004, however architectures suitable for incorporating aspects of the invention may include more than two wireless network interfaces. In an embodiment of the invention, each wireless network interface 1002, 1004 is associated with separate wireless network interface hardware, for example, a WLAN PC card and a separate WWAN PC card. In an alternative embodiment, each wireless network interface 1002, 1004 is associated with a single piece of wireless network interface hardware, for example, multi-mode WLAN/WWAN hardware integrated into the mobile computing device 102. Each wireless network interface 1002, 1004 provides access to the specific features of the associated wireless network interface hardware.

Each wireless network interface 1002, 1004 is accessed by a Multi-Network Manager (MNM) component 1006 via a common network device interface 1008, for example, a common network device interface in compliance with the well known wireless Network Device Interface Standard (NDIS). The network device interface 1008 hides (i.e., encapsulates) the features of specific wireless network interface hardware and provides access to the features of each wireless network type in a standardized way.

In an embodiment of the invention, the Multi-Network Manager component 1006 continuously monitors each wireless network interface 1002, 1004 via the network device interface 1008, for example, monitoring wireless network availability, sampling received signal strength and collecting advertised transmission times. In an embodiment of the invention, the Multi-Network Manager component 1006 initiates the sending of probing data packets in order to measure the data packet collision probability in a wireless network that transmits data in packets. In an embodiment of the invention, the Multi-Network Manager component 1006 further processes the wireless network statistics that it collects and periodically and on request, provides them to a Policy Manager component 1010.

Figure 11:
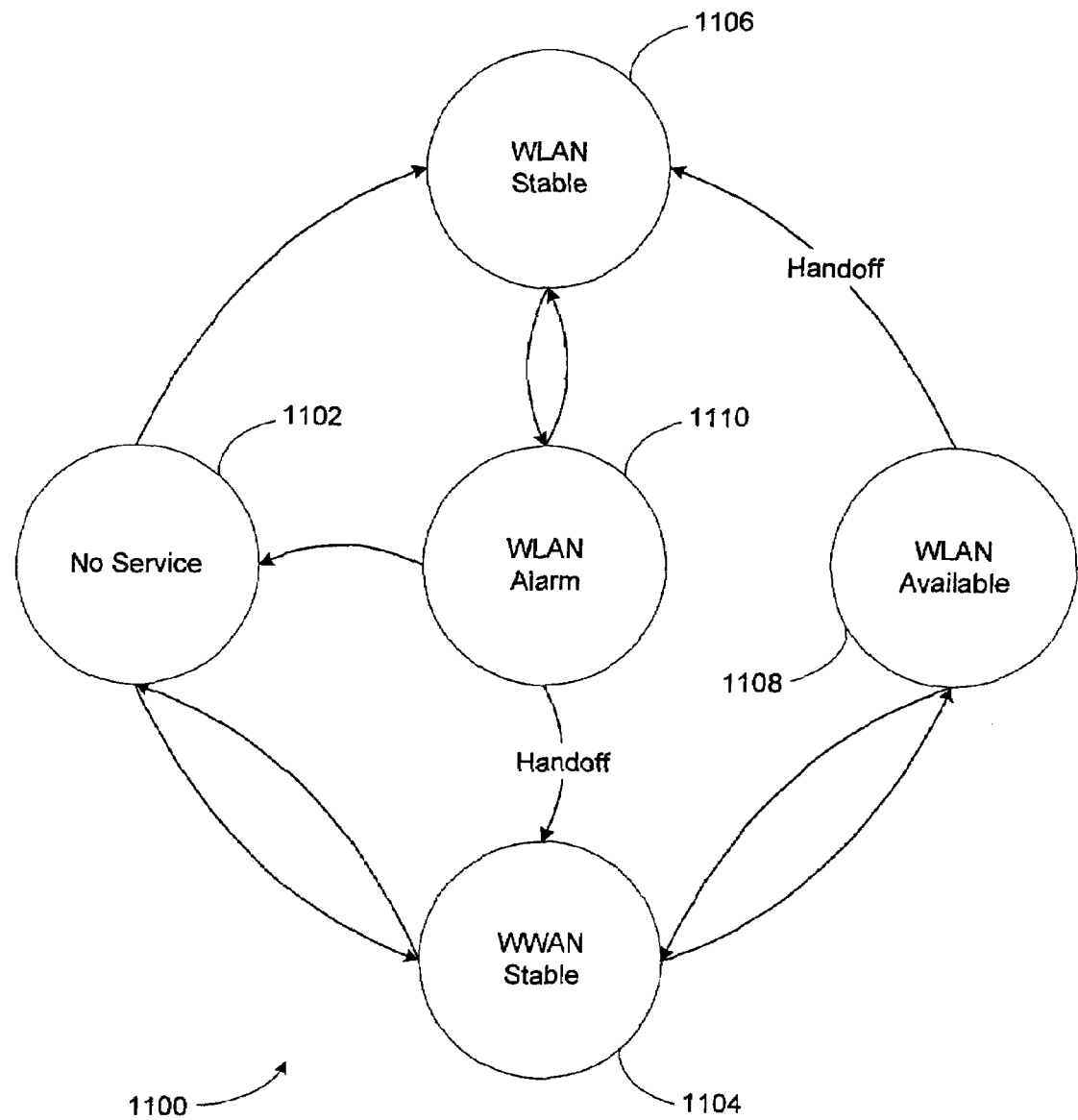
FIG. 11 is a state transition diagram illustrating the behavior of a state machine in accordance with an embodiment of the invention.

In an embodiment of the invention, the Multi-Network Manager component 1006 instantiates and maintains a state machine, such as the state machine 1100 depicted in FIG. 11, generates wireless network notifications (e.g., a wireless network alarm indicating that a wireless network cell boundary is approaching) as dictated by the state machine, and dispatches the notifications to registered wireless network notification subscribers, such as the Policy Manager component 1010. In an embodiment of the invention, the Multi-Network Manager component 1006 detects an approaching high quality of service wireless network cell boundary and, while staying in the high quality of service wireless network as long as possible, initiates a vertical handoff before the wireless network cell boundary is reached.

The Policy Manager component 1010 provides for the ability for mobile computing device applications 1012 to configure one or more wireless network vertical roaming policies. Wireless network vertical roaming policy examples include: never automatically initiate vertical handoff (i.e., manual vertical handoff only), stay in a particular wireless network type whenever possible, automatically handoff to the wireless network able to provide the highest quality of service (e.g., highest residual bandwidth, lowest MAC layer transmission delay, most cost effective, and/or various weighted combinations thereof), and handoff to a particular wireless network whenever a particular quality of service attribute is required, for example, a particular type of physical (PHY) layer transmission security is required.

The Policy Manager component 1010 receives quality of service statistics and wireless network status notifications for each wireless network for which the mobile computing device 102 has a wireless network interface 1002, 1004 from the Multi-Network Manager 1006 and utilizes the information in making wireless network vertical handoff decisions consistent with the configured wireless network vertical roaming policies. For example, if the configured policy is automatically handoff to the wireless network able to provide the highest quality of service and the mobile computing device 102 user (not shown) has utilized one of the mobile computing device 102 applications 1012 to define quality of service solely in terms of residual bandwidth, then the Policy Manager component 1010 does initiate a vertical handoff to a candidate wireless network that has a higher estimated residual bandwidth, as provided by the Multi-Network Manager component 1006.

In an embodiment of the invention, the Policy Manager component 1010 initiates a vertical handoff by sending a HandoffNow command to the Multi-Network Manager component 1006. In an embodiment of the invention, the Policy Manager component 1010 configures the Multi-Network Manager component 1006 to automatically perform vertical handoffs in some cases, for example, when a WLAN cell boundary is detected.

Collectively, the Multi-Network Manager component 1006 and the Policy Manager component are known as the Vertical Roaming Manager 1014 or simply the Connection Manager 1014. The mobile computing device 102 applications 1012 communicate with the Vertical Roaming Manager 1014 rather than with each of its components 1006, 1010 directly. For example, in an embodiment of the invention, one of the mobile computing device 102 applications 1012 initiates a manual vertical handoff by sending a Handoff Now command to the Vertical Roaming Manager 1014. In an embodiment of the invention, the Vertical Roaming Manager 1014 first passes the command to the Policy Manager 1010 to ensure that it is consistent with the configured wireless network vertical roaming policies. In an alternative embodiment, the Vertical Roaming Manager 1014 passes the command directly to the Multi-Network Manager 1006 for execution.

The table below sets out an example of a specific set of operations that the Multi-Network Manager component 1006 is capable of in an embodiment of the invention. The table lists the name of each operation, example attributes for carrying out the operation and example attributes sent in response to the operation request once the operation has been carried out.

| Operation Name | Operation Attributes | Response Attributes |
|---|---|---|
| Handoff Now | Identifier of the wireless network to become the current wireless network service provider. | Succeed/Fail. |
| Configure Active MAC Sense | Identifier of the wireless network for which to configure active MAC sensing. Whether to enable or disable active MAC sensing (i.e., probing) for that wireless network, and, if enabled: the size of the probing data packets; the number of data packets per probe; and the probe duration. | Succeed/Fail. |
| Configure Network Alarm Margin | Identifier of the wireless network for which to configure the Network Alarm Margin. The margin above minimum operating signal strength during which the Multi-Network Manager may generate Network Alarm notifications. | Succeed/Fail. |
| Register For Notifications | Identifiers of the wireless networks for which to send notifications. List of notifications for which to register. | Succeed/Fail. |
| Suppress Alarms | Identifier of the wireless network for which to suppress Network Alarms. The time period for which to suppress the Network Alarms. | Succeed/Fail. |
| Get Interface List | | The number of wireless network interfaces with which the mobile computing device 102 is equipped. The name of each interface. A unique identifier (e.g., symbolic link) for each interface. The interface associated |

-continued

| Operation Name | Operation Attributes | Response Attributes |
|---|---|---|
| Get MNM State | | with the wireless network currently providing service. The current state of the Multi-Network Manager state machine. |

Referring to the example operations in the above table, each of which may be incorporated singly or in combination into an embodiment of the invention, the Handoff Now operation causes the Multi-Network Manager component 1006 to initiate a vertical handoff to the specified wireless network. The Configure Active MAC Sense operation specifies whether or not to use data packet collision probability to estimate residual bandwidth in the specified wireless network as previously described. The Configure Network Alarm Margin operation specifies the received signal strength margin (e.g., 6 dB) above the actual minimum operating signal strength during which, if the received signal strength is determined to be decreasing, the Multi-Network Manager component 1006 does determine that a wireless network cell boundary is approaching and generate Network Alarm notifications to the Policy Manager component 1010. The wireless network alarm margin and alarm generation in general is discussed in more detail below.

Still referring to the example operations in the above table, the Register For Notifications operation enables interested components, such as the Policy Manager component 1010, to register for notifications, such as Network Alarm notifications. Refer to the notification table below for examples of notifications that the Multi-Network Manager component 1006 generates in an embodiment of the invention. The Suppress Alarms operation allows a component that is registered to receive notifications to temporarily suppress Network Alarms from the Multi-Network Manager component 1006. The Get Interface List operation is a query operation that results in a list of the wireless network interfaces incorporated into the mobile computing device 102 being sent to the requester. The Get MNM State operation is a query operation that results in the current state of the Multi-Network Manager component 1006, for example, one of the states illustrated in FIG. 11, being sent to the requester.

The table below sets out an example of a specific set of notifications that the Multi-Network Manager component 1006 sends to each registered component in an embodiment of the invention. The table lists the name of each notification and the attributes sent with the notification.

| Notification Name | Notification Attributes |
|---|---|
| Network Available | An identifier of one of the wireless networks that has become available. Quality of service attributes for that network. |
| Network Alarm | The identifier of one of the wireless networks likely to become unavailable. Quality of service attributes for that network. |
| No Service | The identifier of one of the wireless networks that is no longer able to provide service. |

In an embodiment of the invention, the Network Available notification is generated by the Multi-Network Manager component 1006 when a previously unavailable wireless network becomes available, e.g., a valid basic service set identifier (BSSID) is obtained in a wireless network conforming to the IEEE 802.11b standard. In an embodiment of the invention, the Network Alarm notification is generated by the Multi-Network Manager component 1006 when a wireless network is likely to become unavailable soon, e.g., the received signal strength at the mobile computing device 102 has been determined by the Multi-Network Manager component 1006 to be decreasing and the received signal strength is within a margin (e.g., 6 dB) of the actual minimum operating signal strength for the associated wireless network interface. In an embodiment of the invention, the No Service notification is generated by the Multi-Network Manager component 1006 when a previously available wireless network becomes unavailable, i.e., is no longer able to provide wireless network service.

FIG. 11 depicts an example state machine 1100 instantiated by the Multi-Network Manager component 1006 (of FIG. 10) in an embodiment of the invention. The mobile computing device 102 for which the example state machine was generated incorporates two wireless network interfaces, a wireless local area network (WLAN) interface and a wireless wide area network (WWAN) interface. In this example, the wireless local area network provides a potentially higher quality of service than the wireless wide area network, but the wireless local area network cell size is much smaller than the wireless wide area network cell size (e.g., FIG. 2 is in accord with this example). The Policy Manager component 1010 (of FIG. 10) is configured with vertical handoff policies that instruct the Policy Manager component 1010 to obtain wireless network service whenever possible, and to automatically trigger a vertical handoff to the wireless network that provides the highest quality of service.

In a No Service state 1102, wireless network service is not available from either wireless network interface. If wireless network service first becomes available from the WWAN interface, the Multi-Network Manager component 1006 sends the Network Available notification to the Policy Manager component 1010 notifying it that the wireless wide area network has become available, as well as of the wireless wide area network's quality of service statistics. One of the Policy Manager component's 1010 policies instructs it to obtain wireless network service whenever possible, so the Policy Manager component 1010 sends a Handoff Now command to the Multi-Network Manager component 1006 to initiate entry into the wireless wide area network. The Multi-Network Manager component 1006 manages the set-up of a wireless wide area network connection (using prior art techniques) and, once the connection is established, the state machine transitions to a WWAN Stable state 1104.

Similarly, if wireless network service first becomes available from the WLAN interface, the Multi-Network Manager component 1006 sends the Network Available notification to the Policy Manager component 1010 notifying it that the WLAN has become available, as well as of the wireless local area network's quality of service statistics. The Policy Manager component 1010 sends a Handoff Now command to the Multi-Network Manager component 1006 to initiate entry into the WLAN. The Multi-Network Manager component 1006 manages the set-up of a WLAN connection (using prior art techniques) and, once the connection is established, the state machine transitions to a WLAN Stable state 1106.

If wireless network service becomes available from both the WWAN interface and the WLAN interface at the same moment, the Multi-Network Manager component 1006 sends two Network Available notifications to the Policy Manager component 1010 notifying it that both the WWAN and the WLAN have become available, as well as each of the wireless network's quality of service statistics. One of the Policy Manager component's 1010 configured policies instructs the Policy Manager component 1010 to automatically select the wireless network that provides the highest quality of service. By comparing the quality of service statistics provided by the Multi-Network Manager component 1006, the Policy Manager component 1010 is able to determine the wireless network currently providing the highest quality of service and initiate entry into that wireless network.

In the WWAN Stable state 1104, wireless network service is available from the wireless wide area network. If the service becomes unavailable, the Multi-Network Manager component 1006 sends the No Service notification to the Policy Manager component 1010 notifying it that the WWAN has become unavailable, and the state machine transitions to the No Service state 1102. However, if, in addition to the WWAN being available, the WLAN becomes available, the state machine transitions to a WLAN Available state 1108.

In the WLAN Available state 1108, wireless network service is available from both the wireless wide area network and the wireless local area network, but the wireless wide area network is the current wireless network service provider. While in this state, the Multi-Network Manager component 1006 periodically (e.g., every 10 seconds) sends the Network Available notification to the Policy Manager component 1010 notifying it that the WLAN is available, as well as the wireless local area network's current quality of service statistics. If the Policy Manager component 1010 determines that the WLAN will provide a higher quality of wireless network service, for example, the estimated residual bandwidth in the WLAN is higher than the communications bandwidth currently being experienced in the WWAN, then the Policy Manager component 1010 sends a Handoff Now command to the Multi-Network Manager component 1006 to initiate entry into the WLAN. The Multi-Network Manager component 1006 manages the set-up of a WLAN connection, the WLAN becomes the preferred wireless network service provider (i.e., the vertical handoff from WWAN to WLAN occurs) and the state machine transitions to the WLAN Stable state 1106. If instead the WLAN becomes unavailable, the state machine transitions to the WWAN Stable state 1104.

In the WLAN Stable state 1106, wireless network service is available from the WLAN. Wireless network service may also be available from the WWAN. If the Multi-Network Manager component 1006 detects a WLAN perimeter cell boundary approaching (i.e., a WLAN cell boundary that won't be handled by a prior art horizontal handoff), the state machine transitions to a WLAN Alarm state 1110.

In a WLAN Alarm state 1110, wireless network service is currently available from the WLAN, but the Multi-Network Manager component 1006 has determined that the mobile computing device 102 incorporating the WLAN interface is approaching a WLAN perimeter cell boundary, i.e., that it is likely that the WLAN will soon be unable to provide wireless network service. Wireless network service may also be available from the WWAN. While in this state, the Multi-Network Manager component 1006 periodically (e.g., 10 times per second) sends the Network Alarm notification to the Policy Manager component 1010 notifying it that the WLAN is likely to become unavailable, as well as the wireless local area network's current quality of service statistics. The Policy Manager component 1010 may temporarily suppress Network Alarm notifications from the Multi-Network Manager component 1006 by sending the Multi-Network Manager component 1006 a Suppress Alarms command. Those of skill in the art will appreciate that notifications may be sent by the Multi-Network Manager component 1006 utilizing alternative mechanisms, such as by a callback function registered with the Multi-Network manager component 1006 by notification subscribers.

If the Multi-Network Manager component 1006 determines that the mobile computing device 102 incorporating the WLAN interface is no longer approaching a WLAN perimeter cell boundary, i.e., the conditions that resulted in the Multi-Network Manager component 1006 determining that the mobile computing device 102 was approaching a WLAN perimeter cell boundary no longer hold, then the state machine transitions to the WLAN Stable state 1106. If the Multi-Network Manager component 1006 determines that the WLAN perimeter cell boundary has been reached, for example, the signal strength received at the WLAN interface has fallen to the adaptively determined minimum operating signal strength for the WLAN interface, then, in an embodiment of the invention, if wireless network service is available from the WWAN, the Multi-Network Manager component 1006 automatically initiates a vertical handoff to the WWAN. Once the handoff is complete, the state machine transitions to the WWAN Stable state 1104. However, if the wireless network service is not available from the WWAN and the WLAN perimeter cell boundary is crossed, then wireless network service is not available from either wireless network interface and the state machine transitions to the No Service state 1002.

Figure 12:
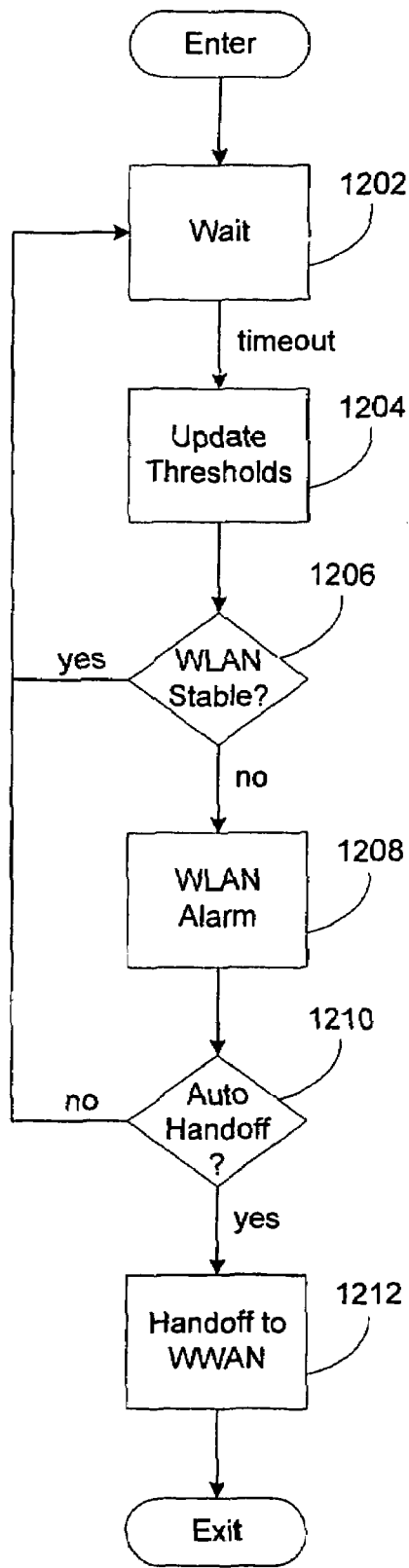
FIG. 12 is a flowchart depicting steps performed by a Multi-Network Manager component when making a decision to handoff from a wireless local area network (WLAN) to a wireless wide area network (WWAN) in accordance with an embodiment of the invention.

FIG. 12 depicts an example procedure utilized by the Multi-Network Manager component 1006 (in FIG. 10) when automatically making a decision to initiate a vertical handoff from a wireless local area network to a wireless wide area network in accordance with an embodiment of the invention. The first step in the procedure is a wait step 1202. The wait step 1202 provides a time (e.g., 0.1 seconds) between wireless network measurement, and serves mainly to prevent the Multi-Network Manager component 1006 from overburdening the mobile computing device 102's processing resources. From the wait step 1202, the procedure progresses to an update thresholds step 1204. The update thresholds step 1204 adaptively adjusts the actual minimum operating signal strength and related thresholds for each wireless network interface. The update thresholds step 1204 is described in more detail with reference to FIG. 13 below. Following the update thresholds step 1204, the procedure progresses to a first decision step 1206.

At the first decision step 1206, the Multi-Network Manager component 1006 determines if a WLAN perimeter cell boundary is approaching, that is, if the Multi-Network Manager component 1006 should remain in the WLAN Stable state 1106 (of FIG. 11). If it is determined that the Multi-Network Manager component 1006 should remain in the WLAN Stable state 1106, the procedure returns to the wait step 1202. If it is determined that a WLAN perimeter cell boundary is approaching, then the procedure progresses to a WLAN alarm step 1208. The first decision step 1206 is described in more detail with reference to FIG. 14 and FIG. 15 below.

At the WLAN alarm step 1208 (corresponding to the WLAN Alarm state 1110 of FIG. 11), the Multi-Network Manager component 1006 sends a Network Alarm notification to registered subscribers such as the Policy Manager 1010 (of FIG. 10). Following the WLAN alarm step 1208, the procedure progresses to a second decision step 1210. At the second decision step 1210, the Multi-Network Manager component 1006 determines if it should automatically initiate a vertical handoff from the WLAN to the WWAN. If the Multi-Network Manager component 1006 determines that it should not automatically initiate a vertical handoff, the procedure returns to the wait step 1202. If the Multi-Network Manager component 1006 determines that it should automatically initiate a vertical handoff, the procedure progresses to a handoff to WWAN step 1212. The second decision step 1210 is described in more detail with reference to FIG. 16 below. At the handoff to WWAN step 1212, a vertical handoff from the WLAN to the WWAN is initiated. A successful vertical handoff corresponds to the transition from the WLAN Alarm state 1110 of FIG. 11 to the WWAN Stable state 1104.

Figure 13:
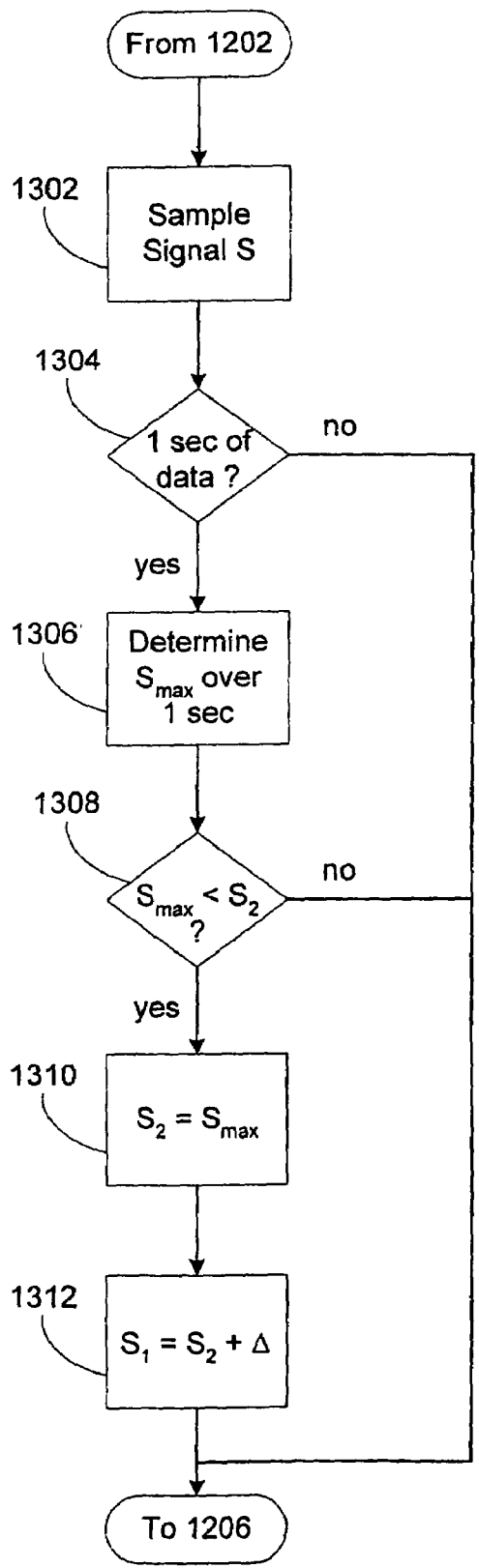
FIG. 13 is a flowchart depicting steps performed by a Multi-Network Manager component when updating vertical handoff decision thresholds in accordance with an embodiment of the invention.

FIG. 13 depicts the update thresholds step 1204 of FIG. 12 in more detail. Following the wait step 1202 (of FIG. 12) the procedure progresses to a sample signal step 1302. At the sample signal step 1302, the signal strength received at each wireless network interface incorporated into the mobile computing device 102 is sampled. The length of the wait step 1204 (of FIG. 12) determines how often the sampling takes place. Following the sample signal step 1302, the procedure progresses to a first decision step 1304. At the first decision step 1304, it is determined if sufficient data has been collected for a threshold update, for example, 1 second worth of data. This corresponds to the time period divisions of FIG. 9. If sufficient data has not yet been collected, the procedure exits the update thresholds step 1204. If sufficient data has been collected, the procedure progresses to a determine $S_{max}$ step 1306.

At the determine $S_{max}$ step 1306, the maximum received signal strength during the sampling period ($S_{max}$) is determined for each wireless network interface. The procedure then progresses to a second decision step 1308. At the second decision step 1308, for each wireless network interface, $S_{max}$ is compared with the current minimum operating signal strength configured for the wireless network interface ($S_2$). If, for any of the wireless network interfaces, the maximum received signal strength during the sampling period $S_{max}$ is less than the current minimum operating signal strength configured for the wireless network interface $S_2$ and the wireless network interface is able to provide wireless network service (e.g., as indicated by the network device interface 1008 of FIG. 10), then $S_2$ may be lowered and the procedure progresses to step 1310. Otherwise the procedure exits the update thresholds step 1204.

At step 1310, for each wireless network interface where $S_{max}$ is less than $S_2$, the minimum operating signal strength configured for the wireless network interface $S_2$ is set to the maximum received signal strength during the sampling period $S_{max}$. The procedure then progresses to step 1312. At step 1312, for each wireless network interface modified at step 1310, another vertical handoff threshold, a wireless network alarm threshold ($S_1$) is set equal to the new minimum operating signal strength for the wireless network interface plus a configurable signal strength margin $\Delta$. In an embodiment of the invention, the wireless network alarm threshold $S_1$ is utilized as part of the procedure to determine if a WLAN perimeter cell boundary is approaching, as described below. In an embodiment of the invention, signal strength margin $\Delta$ is configured with the Multi-Network Manager component 1006 Configure Network Alarm Margin operation. Once step 1312 is complete, the procedure progresses to the first decision step 1206 of FIG. 12.

Figure 14:
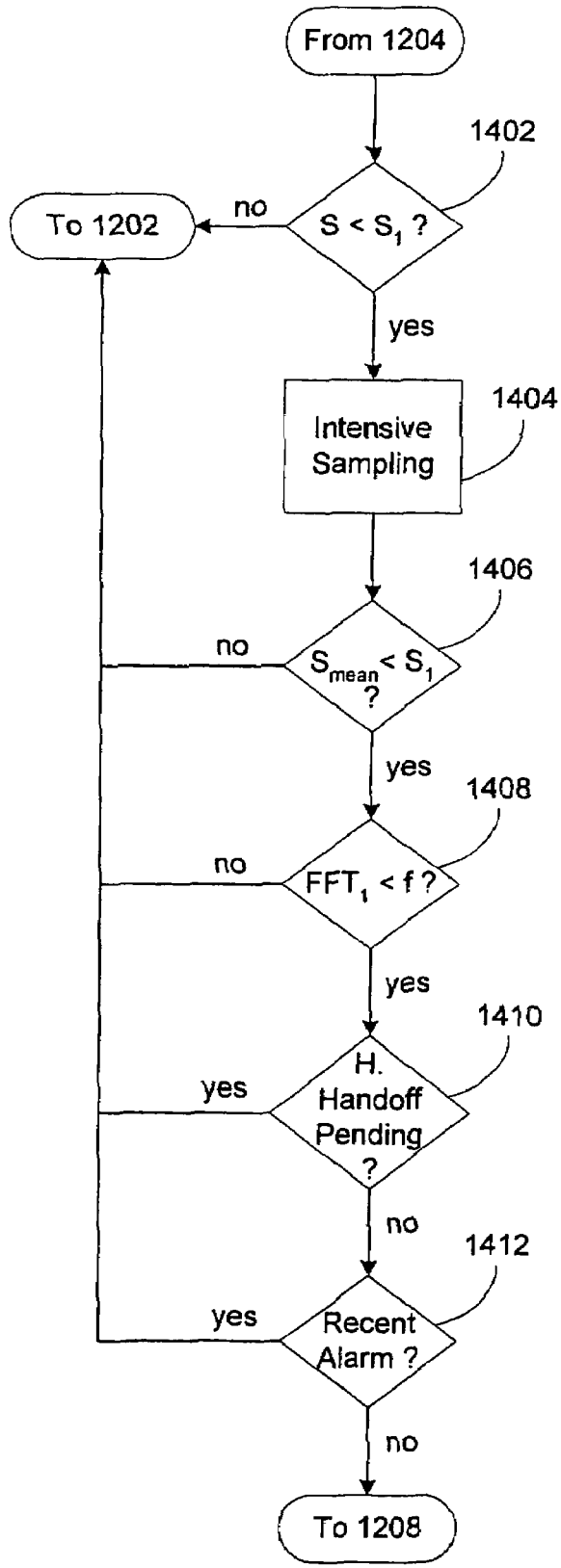
FIG. 14 is a flowchart depicting steps performed by a Multi-Network Manager component when making a decision to generate a Network Alarm notification in accordance with an embodiment of the invention.

FIG. 14 depicts the first decision step 1206 of FIG. 12 in more detail. Following the update thresholds step 1204 (of FIG. 12) the procedure progresses to a cell boundary detection trigger test 1402. At test step 1402, the most recent received signal strength sample for each wireless network interface (from step 1302 in FIG. 13) is compared to the wireless network alarm threshold $S_1$ for that wireless network interface. If the received signal strength sample is above the alarm threshold S1, the procedure returns to the wait step 1202 of FIG. 12. If the received signal strength sample is below the alarm threshold $S_1$, the procedure progresses to an intensive sampling step 1404. At the intensive sampling step 1404, the received signal strength for each wireless network interface that tripped its alarm threshold $S_1$ is sampled intensively (e.g., at the rate of 10 times per second) and the data made available to the next two tests.

Following the intensive sampling step 1404, the procedure progresses to a wireless network alarm threshold test 1406. At the wireless network alarm threshold test, for each wireless network interface that was sampled intensively, the mean of the intensively sampled signal strengths is determined. If the mean of the intensively sampled signal strengths is less than the alarm threshold $S_1$ for the wireless network interface, then the procedure progresses to a Fourier-based decreasing signal test 1408. Otherwise, the procedure returns to the wait step 1202 of FIG. 12.

At the Fourier-based decreasing signal test 1408, for each wireless network interface that passed the wireless network alarm threshold test 1406, the Fast Fourier Transform (FFT) of the intensively sampled signal strengths is determined. The Fast Fourier Transform is well known in the art and need not be described in detail here. If the imaginary part of the fundamental term of the Fourier transform is negative and less than a Fourier domain threshold, then the received signal strength at the wireless network interface is determined to be decreasing and the procedure progresses to a horizontal handoff step 1410. Otherwise, the procedure returns to the wait step 1202 of FIG. 12.

At the horizontal handoff step 1410, it has been determined that the received signal strength at one of the wireless network interfaces is below the wireless network alarm threshold $S_1$ for that wireless network interface and is decreasing, that is, that a wireless network cell boundary is being approached. It may be that a traditional horizontal handoff will occur to an adjacent wireless network cell of the same type. At the horizontal handoff step 1410, it is determined whether or not this is likely the case. If it is determined that it is likely that a horizontal handoff will occur, the procedure returns to the wait step 1202 of FIG. 12. If it is determined that a horizontal handoff is not likely, then a vertical handoff may be necessary and the procedure progresses to a suppress alarm step 1412. The horizontal handoff step 1410 is described in more detail with reference to FIG. 15 below.

At the suppress alarm step 1412, a check is made with regard to how recently this step 1412 was last performed. If this step has been performed recently (e.g., more recently than 0.5 seconds ago) then a recent Network Alarm notification was generated and another need not be generated yet. The procedure returns to the wait step 1202 of FIG. 12. Otherwise, a new Network Alarm notification is called for and the procedure progresses to the WLAN alarm step 1208 of FIG. 12 where a Network Alarm notification is generated.

Figure 15:
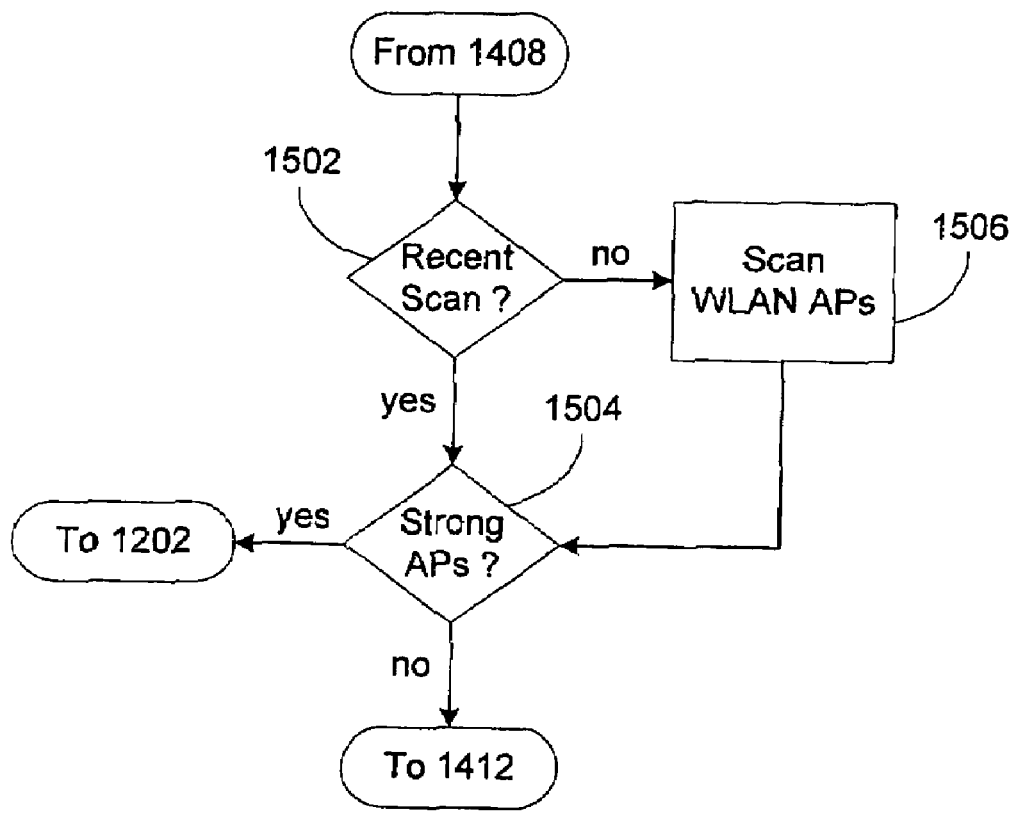
FIG. 15 is a flowchart depicting steps performed by a Multi-Network Manager component when determining that a horizontal WLAN handoff is pending in accordance with an embodiment of the invention.

FIG. 15 depicts the horizontal handoff step 1410 of FIG. 14 in more detail. Following the Fourier-based decreasing signal test 1408 (of FIG. 14) the procedure progresses to a recent horizontal scan test 1502. In an embodiment of the invention, the received signal strength at the wireless network interface of the mobile computing device 102 from possible horizontal handoff candidate wireless network access points in a wireless network is sampled (scanned) only periodically, for example, once every 10 seconds. In the recent horizontal scan test step 1502, it is determined (e.g., by querying the common network device interface 1008 of FIG. 10) if a recent (e.g., within the last 0.5 seconds) access point scan has occurred. If a recent scan has occurred then the procedure can progress directly to the strong access point test 1504. Otherwise, the procedure must first progress to step 1506 where such a scan cycle is initiated. Once recent data for horizontal handoff candidate access points have been obtained, the procedure progresses to the strong access point test 1504.

At the strong access point test 1504, the received signal strength at the wireless network interface from each horizontal handoff candidate is compared to the configured minimum operating signal strength $S_2$ for that wireless network interface. If none of the candidate access points is causing a received signal strength above the minimum operating signal strength $S_2$, then it is determined that a horizontal handoff is not likely and the procedure progresses towards a possible vertical handoff. Otherwise, it is determined that a horizontal handoff is likely, and the procedure returns to the wait step 1202 of FIG. 12.

Figure 16:
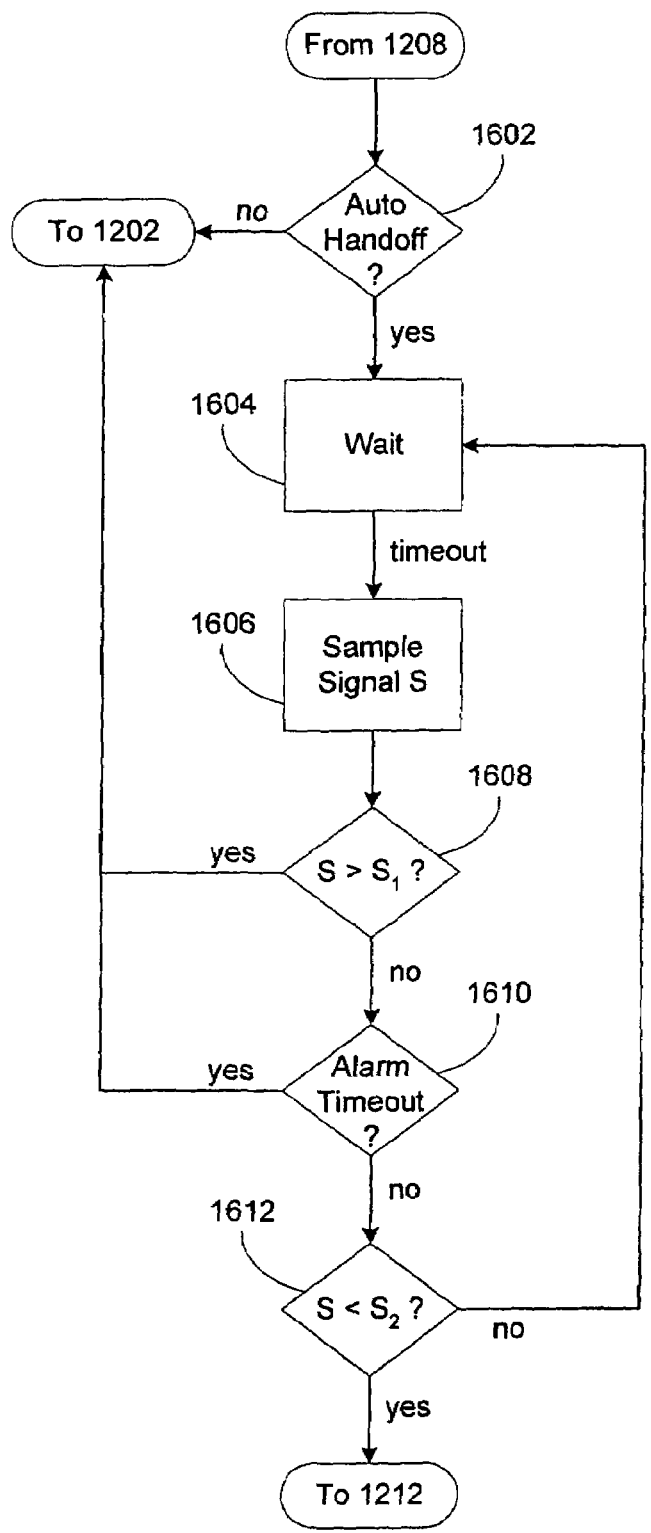
FIG. 16 is a flowchart depicting steps performed by a Multi-Network Manager component when making an automatic WLAN to WWAN handoff decision in accordance with an embodiment of the invention.

FIG. 16 depicts the second decision step 1210 of FIG. 12 in more detail. Following the WLAN alarm step 1208 (of FIG. 12) the procedure progresses to an automatic handoff license check 1602. In an embodiment of the invention, this procedure is carried out by the Multi-Network Manager component 1006 of FIG. 10. In an embodiment of the invention, the Policy Manager component 1010 also of FIG. 10 configures the Multi-Network Manager component 1006 to perform an automatic vertical handoff in the case of a wireless network cell boundary being reached. In this embodiment, the automatic handoff license check 1602 is passed and the procedure progresses to an automatic vertical handoff wait step 1604. In an alterative embodiment of the invention, the Policy Manager component 1010 makes the vertical handoff decision even in the case of a wireless network cell boundary being reached. In this embodiment, the automatic handoff license check 1602 is not passed, and the procedure returns to the wait step 1202 of FIG. 12.

The automatic vertical handoff wait step 1604 serves the same purpose as the wait step 1202 of FIG. 12, but keeps the procedure tightly focused on the impending vertical handoff. After the wait time (e.g., 0.1 seconds) of step 1604 passes, the procedure progresses to step 1606 where the received signal strength at the wireless network interface approaching a wireless network cell boundary is sampled. The procedure then progresses to a reverse wireless network alarm threshold test 1608. At step 1608, the sampled received signal strength is compared to the wireless network alarm threshold $S_1$ configured for the wireless network interface. If the sampled received signal strength is greater than the wireless network alarm threshold $S_1$, then the impending vertical handoff is aborted and the procedure returns to the wait step 1202 of FIG. 12. Otherwise the procedure progresses to a waiting for handoff timeout check 1610.

At step 1610, it is determined how much time has elapsed since step 1602 was last performed. If too much time has elapsed waiting for an automatic vertical handoff to be initiated (e.g., 5 seconds), the impending vertical handoff is aborted and the procedure returns to the wait step 1202 of FIG. 12. Otherwise, the procedure progresses to a minimum operating signal strength test 1612. At step 1612, the sampled received signal strength is compared with the configured minimum operating signal strength for the wireless network interface $S_2$. If the received signal strength has dropped below the minimum operating signal strength $S_2$, the procedure progresses to step 1212 of FIG. 12 where the vertical handoff is initiated. Otherwise, the wireless network interface is still able to provide service at this level of received signal strength and, in order to remain within the high quality of service wireless network (i.e., the WLAN) as long as possible, the procedure returns to the automatic vertical handoff wait step 1604.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of wireless network cell boundary detection, comprising:
   periodically obtaining signal strength samples of wireless network signal strength received at a wireless network interface to a wireless network;
   taking a Discrete Fourier Transform of the received signal strength samples; and
   determining that signal strength received at the wireless network interface is decreasing in the time domain if an imaginary part of a fundamental term of the Discrete Fourier Transform of the received signal strength samples is negative and less than a Fourier-domain threshold.

2. The method according to claim 1, wherein:
   the wireless network is a first type of wireless network; and
   the method further comprises initiating a vertical handoff from the first type of wireless network to a second type of wireless network if signal strength received at the wireless network interface to the first type of wireless network is determined to be decreasing and an arithmetic mean of the samples of the signal strength received at the wireless network interface to the first type of wireless network is less than a minimum operating signal strength threshold.

3. The method according to claim 2, wherein the first type of wireless network comprises a wireless local area network.

4. The method according to claim 2, wherein the second type of wireless network comprises a wireless wide area network.

5. The method according to claim 2, further comprising determining that a vertical handoff from the second type of wireless network to the first type of wireless network is desirable if a calculated wireless network quality of service measure in the first type of wireless network is greater than the observed wireless network quality of service in the second type of wireless network.

6. A computer-readable storage medium having thereon computer executable instructions for performing the method of claim 1.

7. A computer-implemented method of wireless network cell boundary detection, comprising:
   periodically obtaining samples of wireless network signal strength received at a wireless network interface to a wireless network;
   intensively obtaining samples of wireless network signal strength received at the wireless network interface when the samples indicate that received signal strength has dropped below a wireless network alarm threshold;
   taking a Discrete Fourier Transform of the intensive received signal strength samples if an arithmetic mean of the intensive received signal strength samples are below the wireless network alarm threshold; and
   determining that the signal strength received at the wireless network interface is decreasing in the time domain if an imaginary part of a fundamental term of the Discrete Fourier Transform of the intensive received signal strength samples is negative and less than a Fourier-domain threshold.

8. The method according to claim 7, further comprising generating a wireless network alarm if the signal strength received at the wireless network interface is decreasing.

9. The method according to claim 7, wherein:
   the wireless network is a first type of wireless network; and
   the method further comprises determining that a vertical handoff from the first type of wireless network to a second type of wireless network is desirable if it is determined that the signal strength received at the wireless network interface to the first type of wireless network is decreasing and the periodic sampling indicates that received signal strength at the wireless network interface to the first type of wireless network has dropped below a minimum operating signal strength threshold.

10. The method according to claim 9, wherein the first type of wireless network comprises a wireless local area network providing a relatively high quality of service.

11. The method according to claim 9, wherein the second type of wireless network comprises a wireless wide area network providing a relatively low quality of service.

12. The method according to claim 9, further comprising determining that a vertical handoff from the second type of wireless network to the first type of wireless network is desirable if the calculated wireless network quality of service measure in the first type of wireless network is greater than the observed wireless network quality of service in the second type of wireless network.

13. A computer-readable storage medium having thereon computer executable instructions for performing the method of claim 7.

14. A computer-implemented method of wireless network cell boundary detection, comprising:
   periodically obtaining samples of wireless network signal strength received at a wireless network interface to a wireless network;
   determining a maximum received signal strength sampled during a time period; and
   if the maximum received signal strength sampled during the time period is less than a minimum operating signal strength threshold for the wireless network interface, reducing the minimum operating signal strength threshold.

15. The method according to claim 14, wherein the minimum operating signal strength threshold is reduced to the maximum received signal strength sampled during the time period.

16. The method according to claim 14, further comprising setting a wireless network alarm threshold for the wireless network interface to the wireless network to a configurable margin above the new minimum operating signal strength threshold for the wireless network interface to the wireless network.

17. The method according to claim 16, further comprising:
   intensively sampling wireless network signal strength received at the wireless network interface to the wireless network when the periodic sampling indicates that received signal strength has dropped below the wireless network alarm threshold for the wireless network interface to the wireless network;
   taking a Discrete Fourier Transform of the intensive received signal strength samples if an arithmetic mean of the intensive received signal strength samples are below the wireless network alarm threshold for the wireless network interface to the wireless network; and
   determining that the signal strength received at the wireless network interface to the wireless network is decreasing if an imaginary part of a fundamental term of the Discrete Fourier Transform of the intensive received signal strength samples is negative and less than a Fourier domain threshold.

18. The method according to claim 17, wherein:
   the wireless network is a first type of wireless network; and
   the method further comprises initiating a vertical handoff from the first type of wireless network to a second type of wireless network if it is determined that the signal strength received at a wireless network interface to the first type of wireless network is decreasing and the periodic sampling indicates that received signal strength at the wireless network interface to the first type of wireless network has dropped below the minimum operating signal strength threshold for the wireless network interface to the first type of wireless network.

19. The method according to claim 18, further comprising initiating a vertical handoff from the second type of wireless network to the first type of wireless network if the calculated wireless network quality of service measure in the first type of wireless network is greater than the observed wireless network quality of service in the second type of wireless network.

20. A computer-readable storage medium having thereon computer executable instructions for performing the method of claim 14.

* * * * *